United States Patent
Faulhaber, Jr. et al.

(10) Patent No.: US 11,550,614 B2
(45) Date of Patent: Jan. 10, 2023

(54) PACKAGING AND DEPLOYING ALGORITHMS FOR FLEXIBLE MACHINE LEARNING

(71) Applicant: Amazon Technologies, Inc., Seattle, WA (US)

(72) Inventors: Thomas Albert Faulhaber, Jr., Seattle, WA (US); Gowda Dayananda Anjaneyapura Range, Redmond, WA (US); Jeffrey John Geevarghese, Vancouver (CA); Taylor Goodhart, Issaquah, WA (US); Charles Drummond Swan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 37 days.

(21) Appl. No.: 17/067,285

(22) Filed: Oct. 9, 2020

(65) Prior Publication Data
US 2021/0073021 A1    Mar. 11, 2021

Related U.S. Application Data

(63) Continuation of application No. 15/901,751, filed on Feb. 21, 2018, now Pat. No. 10,831,519.
(Continued)

(51) Int. Cl.
*G06F 9/455*    (2018.01)
*G06F 9/50*     (2006.01)
(Continued)

(52) U.S. Cl.
CPC .......... *G06F 9/45558* (2013.01); *G06F 9/455* (2013.01); *G06F 9/5055* (2013.01);
(Continued)

(58) Field of Classification Search
CPC .... G06F 9/45558; G06F 9/455; G06F 9/5055; G06F 2009/45575; G06F 2009/45579; G06N 20/00; G06N 5/04
See application file for complete search history.

(56) References Cited

U.S. PATENT DOCUMENTS

| | | |
|---|---|---|
| 9,454,733 B1 | 9/2016 | Purpura et al. |
| 2014/0344194 A1 | 11/2014 | Lee et al. |

(Continued)

FOREIGN PATENT DOCUMENTS

EP    3182280 A1    6/2017

OTHER PUBLICATIONS

Benedicic et al., "Shifter: Fast and consistent HPC workflows using containers", Containers in HPC Workshop, Jun. 29, 2017, 11 pages.
(Continued)

*Primary Examiner* — Emerson C Puente
*Assistant Examiner* — Jonathan R Labud
(74) *Attorney, Agent, or Firm* — Nicholson De Vos Webster & Elliott, LLP

(57) ABSTRACT

Techniques for packaging and deploying algorithms utilizing containers for flexible machine learning are described. In some embodiments, users can create or utilize simple containers adhering to a specification of a machine learning service in a provider network, where the containers include code for how a machine learning model is to be trained and/or executed. The machine learning service can automatically train a model and/or host a model using the containers. The containers can use a wide variety of algorithms and use a variety of types of languages, libraries, data types, etc. Users can thus implement machine learning training and/or hosting with extremely minimal knowledge of how the overall training and/or hosting is actually performed.

20 Claims, 16 Drawing Sheets

Related U.S. Application Data

(60) Provisional application No. 62/590,184, filed on Nov. 22, 2017.

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01); *G06F 2009/45575* (2013.01); *G06F 2009/45579* (2013.01)

(56) References Cited

U.S. PATENT DOCUMENTS

| | | | |
|---|---|---|---|
| 2015/0379072 | A1 | 12/2015 | Dirac et al. |
| 2016/0148115 | A1 | 5/2016 | Sirosh et al. |
| 2016/0359622 | A1 | 12/2016 | Bunch et al. |
| 2017/0017903 | A1* | 1/2017 | Gray ................. G06T 11/60 |
| 2017/0052807 | A1 | 2/2017 | Kristiansson et al. |
| 2017/0177413 | A1 | 6/2017 | Wisniewski et al. |
| 2017/0220949 | A1 | 8/2017 | Feng et al. |
| 2017/0249141 | A1 | 8/2017 | Parees et al. |
| 2018/0089592 | A1 | 3/2018 | Zeiler et al. |
| 2018/0095778 | A1 | 4/2018 | Aydelott et al. |
| 2018/0300653 | A1 | 10/2018 | Srinivasan et al. |
| 2019/0081955 | A1 | 3/2019 | Chugtu et al. |
| 2019/0114370 | A1 | 4/2019 | Cerino et al. |

OTHER PUBLICATIONS

Communication pursuant to Article 94(3) EPC, EP App. No. 18815886.9, dated Sep. 15, 2020, 11 pages.
International Preliminary Report on Patentability, PCT App. No. PCT/US2018/061869, dated Jun. 4, 2020, 13 pages.
International Preliminary Report on Patentability, PCT App. No. PCT/US2018/062223, dated Jun. 4, 2020, 8 pages.
Summons to Attend Oral Proceedings Pursuant to Rule 115(1) EPC, EP App. No. 18815886.9, Mar. 23, 2021, 13 pages.
Final Office Action, U.S. Appl. No. 15/901,751, dated Feb. 14, 2020, 27 pages.
International Search Report and Written Opinion for related International Patent Application No. PCT/US2018/061869, dated Mar. 11, 2019, 18 pages.
International Search Report and Written Opinion issued in related International Patent Application No. PCT/US2018/062223, dated Feb. 25, 2019, 11 pages.
Non-Final Office Action, U.S. Appl. No. 15/901,751, dated Aug. 12, 2019, 22 pages.
Notice of Allowance, U.S. Appl. No. 15/901,751, dated Jul. 2, 2020, 9 pages.
Non-Final Office Action, U.S. Appl. No. 16/001,548, dated May 4, 2021, 39 pages.
Stringfellow, Angela. SOAP vs. REST: Differences in Performance, APIs, and More. Dzone. https://dzone.com/articles/differences-in-performance-apis-amp-more (Year: 2017).
Yash. Single versus Multiple Containers. May 17, 2016. StackOverflow. httpsi//stackoverflow.com/questions/37268790/single-versus-multiple-containers (Year: 2016).
Advisory Action, U.S. Appl. No. 16/001,548, dated Jun. 3, 2022, 4 pages.
Preliminary Opinion, EP App. No. 18815886.9, dated Nov. 9, 2021, 16 pages.
Anonymous: Understand images, containers, and storage drivers Docker, XP055444825 (2016).
Bezgachev, Vitaly. How to deploy Machine Learning models with TensorFlow Parts 1-4. Nov. 12, 2017. TowardsDataScience.com. <https://towardsdatascience.com/how-to-deploy-machine-learning-models-with-tensorflow-part-1-make-your-model-ready-for-serving-776a14ec3198> (Year: 2017).
Cozannet, Samueal. GPUs & Kubernetes for Deep Learning Parts 1-3. Feb. 15, 2017. Medium.com. <https://medium.com/hackernoon/gpus-kubernetes-for-deep-learning-part-1-3-d8eebe0dd6fe> (Year: 2017).
Final Office Action, U.S. Appl. No. 16/001,548, dated Mar. 9, 2022, 16 pages.

* cited by examiner

PACKAGING AND DEPLOYING ALGORITHMS FOR FLEXIBLE MACHINE LEARNING

CROSS-REFERENCE TO RELATED APPLICATIONS

This application is a continuation of U.S. patent application Ser. No. 15/901,751, filed Feb. 21, 2018, which application claims the benefit of U.S. Provisional Application No. 62/590,184, filed Nov. 22, 2017, both of which are hereby incorporated by reference.

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. To facilitate increased utilization of data center resources, virtualization technologies allow a single physical computing device to host one or more instances of virtual machines that appear and operate as independent computing devices to users of a data center.

BRIEF DESCRIPTION OF DRAWINGS

Various embodiments in accordance with the present disclosure will be described with reference to the drawings, in which.

DETAILED DESCRIPTION

Figure 1:
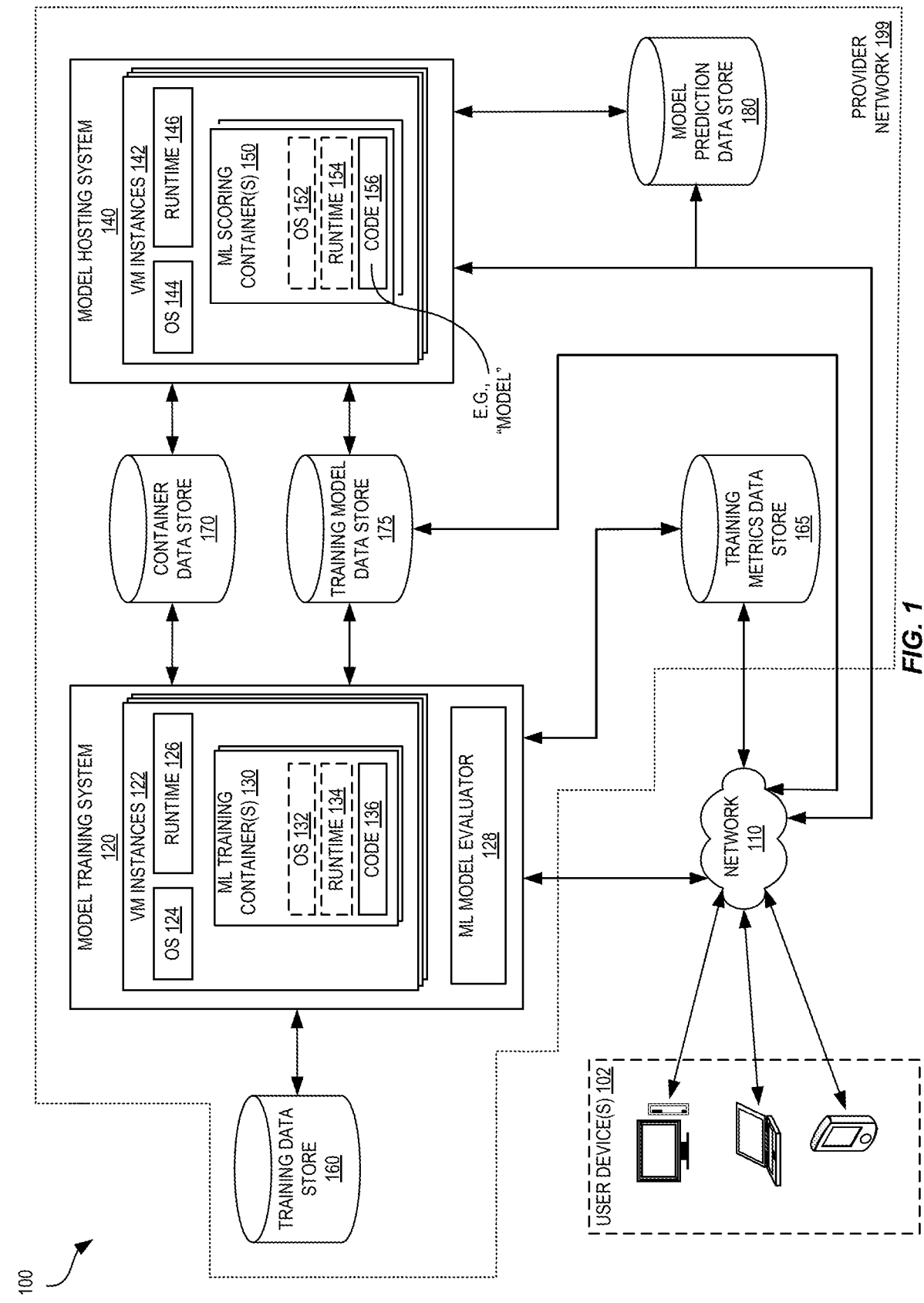
FIG. 1 is a block diagram of an illustrative operating environment in which machine learning models are trained and hosted, in some embodiments.

Various embodiments of methods, apparatus, systems, and non-transitory computer-readable storage media for packaging and deploying algorithms using containers for flexible machine learning. In some embodiments, users can create or utilize relatively simple containers adhering to a specification of a provider network, where the containers include code for how a machine learning model is to be trained and/or executed. The provider network can automatically train a model and/or host a model using the containers. The containers can use a wide variety of algorithms and use a variety of types of languages, libraries, data types, etc. Accordingly, users can simply perform machine learning training and hosting with extremely minimal knowledge of how the overall training and/or hosting is actually performed.

As described above, embodiments enable a single physical computing device (or multiple physical computing devices) to host one or more instances of virtual machines that appear and operate as independent computing devices to users. In some embodiments, a service provider can leverage virtualization technologies to provide a network-accessible machine learning service, such as the network-accessible machine learning model training and hosting system described herein. For example, the service provider can operate one or more physical computing devices accessible to user devices via a network. These physical computing device(s) can host virtual machine instances that are configured to train and/or execute machine learning models in response to commands received from user devices.

The embodiments described herein provide several technical benefits over conventional computing systems configured to train machine learning models. For example, training machine learning models can result in the usage of a large amount of processing power because machine learning models can be very complex and the amount of data used to train the models can be very large (e.g., in the gigabytes, terabytes, petabytes, etc.). Thus, some users acquire physically large conventional computing machines to perform the training. Users, however, may customize these conventional computing machines with specific software to execute the desired model training. On the other hand, embodiments described herein provide an environment in which users do not have to generate and implement a large amount of customized code. Rather, users can simply provide just enough information to define a type of machine learning model to train, and the embodiments described herein can automatically initialize virtual machine instances, initialize containers, and/or perform other operations to implement a model training service.

On the other hand, embodiments described herein are configured to distribute the training across different physical computing devices in some embodiments. Thus, the time to train a model can be significantly reduced.

Valuable time can be lost if the resulting trained model turns out to be inaccurate. On the other hand, embodiments described herein can periodically evaluate models during the training process and output metrics corresponding to the evaluation. Thus, users can review the metrics to determine if, for example, a machine learning model being trained is inaccurate and whether it may be beneficial for the training job to be stopped.

Users can experience significant machine learning model training delays if a conventional computing machine is already in the process of training another model. On the other hand, embodiments described herein dynamically allocate computing resources to perform model training based on user demand in some embodiments. Thus, if a single user or multiple users desire to train multiple machine learning models during an overlapping time period, the trainings can be performed simultaneously.

These conventional services, however, are generally restricted to a single type of machine learning model and only allow prescribed data input formats. Users, on the other hand, may desire to train and use many different types of machine learning models that can receive different types of input data formats. Unlike these conventional services, embodiments described herein provide a flexible execution environment in which machine learning models can be trained and executed irrespective of the type of machine learning model, the programming language in which the machine learning model is defined, the data input format of the machine learning model, and/or the data output format of the machine learning model.

Example Machine Learning Model Training and Hosting Environment

FIG. 1 is a block diagram of an illustrative operating environment 100 in which machine learning models are trained and hosted, in some embodiments. The operating environment 100 includes end user devices 102, a model training system 120, a model hosting system 140, a training data store 160, a training metrics data store 165, a container data store 170, a training model data store 175, and a model prediction data store 180.

Example Model Training System

In some embodiments, users, by way of user devices 102, interact with the model training system 120 to provide data that causes the model training system 120 to train one or more machine learning models. A machine learning (ML) model, generally, may be thought of as one or more equations that are "trained" using a set of data. In some embodiments, the model training system 120 provides ML functionalities as a Web service, and thus messaging between user devices 102 and the model training system 120 (or provider network 199), and/or between components of the model training system 120 (or provider network 199), may utilize HyperText Transfer Protocol (HTTP) messages to transfer data in a machine-readable file format, such as eXtensible Markup Language (XML) or JavaScript Object Notation (JSON).

The user devices 102 can interact with the model training system 120 via frontend 129 of the model training system 120. For example, a user device 102 can provide a training request to the frontend 129 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 102, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 102 may provide, in the training request, an algorithm written in any programming language. The model training system 120 then packages the algorithm into a container (optionally with other code, such as a "base" ML algorithm supplemented with user-provided code) that is eventually loaded into a virtual machine instance 122 for training a machine learning model, as described in greater detail below. For example, a user, via a user device 102, may develop an algorithm/code using an application (e.g., an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 102 provides, in the training request, an indicator of a container image (e.g., an indication of an address or a location at which a container image is stored). For example, the container image can be stored in a container data store 170, and this container image may have been previously created/uploaded by the user. The model training system 120 can retrieve the container image from the indicated location and create a container using the retrieved container image. The container is then loaded into a virtual machine instance 122 for training a machine learning model, as described in greater detail below.

The model training system 120 can use the information provided by the user device 102 to train a machine learning model in one or more pre-established virtual machine instances 122 in some embodiments. In particular, the model training system 120 includes a single physical computing device or multiple physical computing devices that are interconnected using one or more computing networks (not shown), where the physical computing device(s) host one or more virtual machine instances 122. The model training system 120 can handle the acquisition and configuration of compute capacity (e.g., containers, instances, etc., which are described in greater detail below) based on the information describing the computing machine on which to train a machine learning model provided by the user device 102. The model training system 120 can then train machine learning models using the compute capacity, as is described in greater detail below. The model training system 120 can automatically scale up and down based on the volume of training requests received from user devices 102 via frontend 129, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 122 are utilized to execute tasks. For example, such tasks can include training a machine learning model. As shown in FIG. 1, each virtual machine instance 122 includes an operating system (OS) 124, a language runtime 126, and one or more machine learning (ML) training containers 130. Generally, the ML training containers 130 are logical units created within a virtual machine instance using the resources available on that instance, and can be utilized to isolate execution of a task from other processes (e.g., task executions) occurring in the instance. In some embodiments, the ML training containers 130 are formed from one or more container images and a top container layer. Each container image may further include one or more image layers, where each image layer represents an executable instruction. As described above, some or all of the executable instructions together represent an algorithm that defines a machine learning model. Changes made to the ML training containers 130 (e.g., creation of new files, modification of existing files, deletion of files, etc.) are stored in the top container layer. If a ML training container 130 is deleted, the top container layer is also deleted. However, the container image(s) that form a portion of the deleted ML training container 130 can remain unchanged. The ML training containers 130 can be implemented, for example, as Linux containers (LXC), Docker containers, and the like.

The ML training containers 130 may include individual copies of an OS 132 (e.g., portions of an OS, while OS kernel code may not be included within a container but instead be "shared" amongst containers), runtime 134, and code 136 in some embodiments. The OS 132 and/or the runtime 134 can be defined by one or more executable instructions that form at least a portion of a container image that is used to form the ML training container 130 (e.g., the executable instruction(s) in the container image that define the operating system and/or runtime to run in the container formed from the container image). The code 136 includes one or more executable instructions that form at least a portion of a container image that is used to form the ML training container 130. For example, the code 136 includes the executable instructions in the container image that represent an algorithm that defines a machine learning model. The OS 132 and/or runtime 134 are configured to execute the code 136 in response to an instruction to begin machine learning model training. Execution of the code 136 results in the generation of model data, as described in greater detail below.

In some embodiments, the code 136 includes executable instructions that represent algorithms that define different machine learning models. For example, the code 136 includes one set of executable instructions that represent a first algorithm that defines a first machine learning model and a second set of executable instructions that represent a second algorithm that defines a second machine learning model. In some embodiments, the virtual machine instance 122 executes the code 136 and trains all of the machine learning models. In some embodiments, the virtual machine instance 122 executes the code 136, selecting one of the machine learning models to train. For example, the virtual machine instance 122 can identify a type of training data indicated by the training request and select a machine learning model to train (e.g., execute the executable instructions that represent an algorithm that defines the selected machine learning model) that corresponds with the identified type of training data.

In some embodiments, the OS 132 and the runtime 134 are the same as the OS 124 and runtime 126 utilized by the virtual machine instance 122. In some embodiments, the OS 132 and/or the runtime 134 are different than the OS 124 and/or runtime 126 utilized by the virtual machine instance 122.

In some embodiments, the model training system 120 uses one or more container images included in a training request (or a container image retrieved from the container data store 170 in response to a received training request) to create and initialize a ML training container 130 in a virtual machine instance 122. For example, the model training system 120 creates a ML training container 130 that includes the container image(s) and/or a top container layer.

Prior to beginning the training process, in some embodiments, the model training system 120 retrieves training data from the location indicated in the training request. For example, the location indicated in the training request can be a location in the training data store 160. Thus, the model training system 120 retrieves the training data from the indicated location in the training data store 160. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 122 training the machine learning model. Once the virtual machine instance 122 has applied and used the retrieved portion or once the virtual machine instance 122 is about to use all of the retrieved portion (e.g., a buffer storing the retrieved portion is nearly empty), then the model training system 120 can retrieve a second portion of the training data and provide the second retrieved portion to the virtual machine instance 122, and so on.

To perform the machine learning model training, the virtual machine instance 122 executes code 136 stored in the ML training container 130 in some embodiments. For example, the code 136 includes some or all of the executable instructions that form the container image of the ML training container 130 initialized therein. Thus, the virtual machine instance 122 executes some or all of the executable instructions that form the container image of the ML training container 130 initialized therein to train a machine learning model. The virtual machine instance 122 executes some or all of the executable instructions according to the hyperparameter values included in the training request. As an illustrative example, the virtual machine instance 122 trains a machine learning model by identifying values for certain parameters (e.g., coefficients, weights, centroids, etc.). The identified values depend on hyperparameters that define how the training is performed. Thus, the virtual machine instance 122 can execute the executable instructions to initiate a machine learning model training process, where the training process is run using the hyperparameter values included in the training request. Execution of the executable instructions can include the virtual machine instance 122 applying the training data retrieved by the model training system 120 as input parameters to some or all of the instructions being executed.

In some embodiments, executing the executable instructions causes the virtual machine instance 122 (e.g., the ML training container 130) to generate model data. For example, the ML training container 130 generates model data and stores the model data in a file system of the ML training container 130. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 130 such that the model data is written to the top container layer of the ML training container 130 and/or the container image(s) that forms a portion of the ML training container 130 is modified to include the model data.

The virtual machine instance 122 (or the model training system 120 itself) pulls the generated model data from the ML training container 130 and stores the generated model data in the training model data store 175 in an entry associated with the virtual machine instance 122 and/or the machine learning model being trained. In some embodiments, the virtual machine instance 122 generates a single file that includes model data and stores the single file in the training model data store 175. In some embodiments, the virtual machine instance 122 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 122 can package the multiple files into a single file once training is complete and store the single file in the training model data store 175. Alternatively, the virtual machine instance 122 stores the multiple files in the training model data store 175. The virtual machine instance 122 stores the file(s) in the training model data store 175 while the training process is ongoing and/or after the training process is complete.

In some embodiments, the virtual machine instance 122 regularly stores model data file(s) in the training model data store 175 as the training process is ongoing. Thus, model data file(s) can be stored in the training model data store 175 at different times during the training process. Each set of model data files corresponding to a particular time or each set of model data files present in the training model data store 175 as of a particular time could be checkpoints that represent different versions of a partially-trained machine learning model during different stages of the training process. Accordingly, before training is complete, a user, via the user device 102 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 175.

In some embodiments, a virtual machine instance 122 executes code 136 stored in a plurality of ML training containers 130. For example, the algorithm included in the container image can be in a format that allows for the parallelization of the training process. Thus, the model training system 120 can create multiple copies of the container image provided in a training request and cause the virtual machine instance 122 to load each container image copy in a separate ML training container 130. The virtual machine instance 122 can then execute, in parallel, the code 136 stored in the ML training containers 130. The virtual machine instance 122 can further provide configuration information to each ML training container 130 (e.g., information indicating that N ML training containers 130 are collectively training a machine learning model and that a particular ML training container 130 receiving the configuration information is ML training container 130 number X of N), which can be included in the resulting model data. By parallelizing the training process, the model training system 120 can significantly reduce the training time in some embodiments.

In some embodiments, a plurality of virtual machine instances 122 execute code 136 stored in a plurality of ML training containers 130. For example, the resources used to train a particular machine learning model can exceed the limitations of a single virtual machine instance 122. However, the algorithm included in the container image can be in a format that allows for the parallelization of the training process. Thus, the model training system 120 can create multiple copies of the container image provided in a training request, initialize multiple virtual machine instances 122, and cause each virtual machine instance 122 to load a container image copy in one or more separate ML training containers 130. The virtual machine instances 122 can then each execute the code 136 stored in the ML training containers 130 in parallel. The model training system 120 can further provide configuration information to each ML training container 130 via the virtual machine instances 122 (e.g., information indicating that N ML training containers 130 are collectively training a machine learning model and that a particular ML training container 130 receiving the configuration information is ML training container 130 number X of N, information indicating that M virtual machine instances 122 are collectively training a machine learning model and that a particular ML training container 130 receiving the configuration information is initialized in virtual machine instance 122 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 122 that execute the code 136. Thus, the parallelization can occur over different physical computing devices in addition to over different virtual machine instances 122 and/or ML training containers 130.

In some embodiments, the model training system 120 includes a ML model evaluator 128. The ML model evaluator 128 can monitor virtual machine instances 122 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 128 can obtain the model data for a machine learning model being trained and evaluation data from the training data store 160. The evaluation data is separate from the data used to train a machine learning model and includes both input data and expected outputs (e.g., known results), and thus the ML model evaluator 128 can define a machine learning model using the model data and execute the machine learning model by providing the input data as inputs to the machine learning model. The ML model evaluator 128 can then compare the outputs of the machine learning model to the expected outputs, and determine one or more quality metrics of the machine learning model being trained based on the comparison (e.g., the error rate can be a difference or distance between the machine learning model outputs and the expected outputs).

The ML model evaluator 128 periodically generates model metrics during the training process and stores the model metrics in the training metrics data store 165 in some embodiments. While the machine learning model is being trained, a user, via the user device 102, can access and retrieve the model metrics from the training metrics data store 165. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 102, can transmit a request to the model training system 120 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 122 to optionally delete an existing ML training container 130, create and initialize a new ML training container 130 using some or all of the information included in the request, and execute the code 136 stored in the new ML training container 130 to restart the machine learning model training process. As another example, the model training system 120 can cause the virtual machine instance 122 to modify the execution of code stored in an existing ML training container 130 according to the data provided in the modification request. In some embodiments, the user, via the user device 102, can transmit a request to the model training system 120 to stop the machine learning model training process. The model training system 120 can then instruct the virtual machine instance 122 to delete the ML training container 130 and/or to delete any model data stored in the training model data store 175.

As described below, in some embodiments, the model data stored in the training model data store 175 is used by the model hosting system 140 to deploy machine learning models. Alternatively or in addition, a user device 102 or another computing device (not shown) can retrieve the model data from the training model data store 175 to implement a learning algorithm in an external device. As an illustrative example, a robotic device can include sensors to capture input data. A user device 102 can retrieve the model data from the training model data store 175 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 122 are shown in FIG. 1 as a single grouping of virtual machine instances 122, some embodiments of the present application separate virtual machine instances 122 that are actively assigned to execute tasks from those virtual machine instances 122 that are not actively assigned to execute tasks. For example, those virtual machine instances 122 actively assigned to execute tasks are grouped into an "active pool," while those virtual machine instances 122 not actively assigned to execute tasks are placed within a "warming pool." In some embodiments, those virtual machine instances 122 within the warming pool can be pre-initialized with an operating system, language runtimes, and/or other software required to enable rapid execution of tasks (e.g., rapid initialization of machine learning model training in ML training container(s) 130) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 102, the model hosting system 140, etc.). The processing unit can also communicate to and from a memory of a virtual machine instance 122 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

Example Model Hosting System

In some embodiments, the model hosting system 140 includes a single physical computing device or multiple physical computing devices that are interconnected using one or more computing networks (not shown), where the physical computing device(s) host one or more virtual machine instances 142. The model hosting system 140 can handle the acquisition and configuration of compute capacity (e.g., containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 102 via frontend 149 of the model hosting system 140, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 142 are utilized to execute tasks. For example, such tasks can include executing a machine learning model. As shown in FIG. 1, each virtual machine instance 142 includes an operating system (OS) 144, a language runtime 146, and one or more ML scoring containers 150. The ML scoring containers 150 are similar to the ML training containers 130 in that the ML scoring containers 150 are logical units created within a virtual machine instance using the resources available on that instance, and can be utilized to isolate execution of a task from other processes (e.g., task executions) occurring in the instance. In some embodiments, the ML scoring containers 150 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 150 (e.g., creation of new files, modification of existing files, deletion of files, etc.) are stored in the top container layer. If a ML scoring container 150 is deleted, the top container layer is also deleted. However, the container image(s) that form a portion of the deleted ML scoring container 150 can remain unchanged. The ML scoring containers 150 can be implemented, for example, as Linux containers.

The ML scoring containers 150 each include individual copies of an OS 152, runtime 154, and code 156 in some embodiments. The OS 152 and/or the runtime 154 can be defined by one or more executable instructions that form at least a portion of a container image that is used to form the ML scoring container 150 (e.g., the executable instruction(s) in the container image that define the operating system and/or runtime to run in the container formed from the container image). The code 156 includes one or more executable instructions that form at least a portion of a container image that is used to form the ML scoring container 150. For example, the code 156 includes the executable instructions in the container image that represent an algorithm that defines a machine learning model. The code 156 can also include model data that represent characteristics of the defined machine learning model, as described in greater detail below. The OS 152 and/or runtime 154 are configured to execute the code 156 in response to an instruction to begin execution of a machine learning model. Execution of the code 156 results in the generation of outputs (e.g., predicted results), as described in greater detail below.

In some embodiments, the OS 152 and the runtime 154 are the same as the OS 144 and runtime 146 utilized by the virtual machine instance 142. In some embodiments, the OS 152 and/or the runtime 154 are different than the OS 144 and/or runtime 146 utilized by the virtual machine instance 142.

In some embodiments, the model hosting system 140 uses one or more container images included in a deployment request (or a container image retrieved from the container data store 170 in response to a received deployment request) to create and initialize a ML scoring container 150 in a virtual machine instance 142. For example, the model hosting system 140 creates a ML scoring container 150 that includes the container image(s) and/or a top container layer.

As described above, a user device 102 can submit a deployment request and/or an execution request to the model hosting system 140 via the frontend 149 in some embodiments. A deployment request causes the model hosting system 140 to deploy a trained machine learning model into a virtual machine instance 142. For example, the deployment request can include an identification of an endpoint (e.g., an endpoint name, such as an HTTP endpoint name) and an identification of one or more trained machine learning models (e.g., a location of one or more model data files stored in the training model data store 175). Optionally, the deployment request also includes an identification of one or more container images stored in the container data store 170.

Upon receiving the deployment request, the model hosting system 140 initializes ones or more ML scoring containers 150 in one or more hosted virtual machine instance 142. In embodiments in which the deployment request includes an identification of one or more container images, the model hosting system 140 forms the ML scoring container(s) 150 from the identified container image(s). For example, a container image identified in a deployment request can be the same container image used to form an ML training container 130 used to train the machine learning model corresponding to the deployment request. Thus, the code 156 of the ML scoring container(s) 150 includes one or more executable instructions in the container image(s) that represent an algorithm that defines a machine learning model. In embodiments in which the deployment request does not include an identification of a container image, the model hosting system 140 forms the ML scoring container(s) 150 from one or more container images stored in the container data store 170 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 150 by retrieving model data corresponding to the identified trained machine learning model(s) in some embodiments. For example, the deployment request can identify a location of model data file(s) stored in the training model data store 175. In embodiments in which a single model data file is identified in the deployment request, the model hosting system 140 retrieves the identified model data file from the training model data store 175 and inserts the model data file into a single ML scoring container 150, which forms a portion of code 156. In some embodiments, the model data file is archived or compressed (e.g., formed from a package of individual files). Thus, the model hosting system 140 unarchives or decompresses the model data file to obtain multiple individual files, and inserts the individual files into the ML scoring container 150. In some embodiments, the model hosting system 140 stores the model data file in the same location as the location in which the model data file was stored in the ML training container 130 that generated the model data file. For example, the model data file initially was stored in the top container layer of the ML training container 130 at a certain offset, and the model hosting system 140 then stores the model data file in the top container layer of the ML scoring container 150 at the same offset.

In embodiments in which multiple model data files are identified in the deployment request, the model hosting system 140 retrieves the identified model data files from the training model data store 175. The model hosting system 140 can insert the model data files into the same ML scoring container 150, into different ML scoring containers 150 initialized in the same virtual machine instance 142, or into different ML scoring containers 150 initialized in different virtual machine instances 142. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 150 with the endpoint identified in the deployment request. For example, each of the initialized ML scoring container(s) 150 can be associated with a network address. The model hosting system 140 can map the network address(es) to the identified endpoint, and the model hosting system 140 or another system (e.g., a routing system, not shown) can store the mapping. Thus, a user device 102 can refer to trained machine learning model(s) stored in the ML scoring container(s) 150 using the endpoint. This allows for the network address of an ML scoring container 150 to change without causing the user operating the user device 102 to change the way in which the user refers to a trained machine learning model.

Once the ML scoring container(s) 150 are initialized, the ML scoring container(s) 150 are ready to execute trained machine learning model(s). In some embodiments, the user device 102 transmits an execution request to the model hosting system 140 via the frontend 149, where the execution request identifies an endpoint and includes an input to a machine learning model (e.g., a set of input data). The model hosting system 140 or another system (e.g., a routing system, not shown) can obtain the execution request, identify the ML scoring container(s) 150 corresponding to the identified endpoint, and route the input to the identified ML scoring container(s) 150.

In some embodiments, a virtual machine instance 142 executes the code 156 stored in an identified ML scoring container 150 in response to the model hosting system 140 receiving the execution request. In particular, execution of the code 156 causes the executable instructions in the code 156 corresponding to the algorithm to read the model data file stored in the ML scoring container 150, use the input included in the execution request as an input parameter, and generate a corresponding output. As an illustrative example, the algorithm can include coefficients, weights, layers, cluster centroids, and/or the like. The executable instructions in the code 156 corresponding to the algorithm can read the model data file to determine values for the coefficients, weights, layers, cluster centroids, and/or the like. The executable instructions can include input parameters, and the input included in the execution request can be supplied by the virtual machine instance 142 as the input parameters. With the machine learning model characteristics and the input parameters provided, execution of the executable instructions by the virtual machine instance 142 can be completed, resulting in an output.

In some embodiments, the virtual machine instance 142 stores the output in the model prediction data store 180. Alternatively or in addition, the virtual machine instance 142 transmits the output to the user device 102 that submitted the execution result via the frontend 149.

In some embodiments, the execution request corresponds to a group of related trained machine learning models. Thus, the ML scoring container 150 can transmit the output to a second ML scoring container 150 initialized in the same virtual machine instance 142 or in a different virtual machine instance 142. The virtual machine instance 142 that initialized the second ML scoring container 150 can then execute second code 156 stored in the second ML scoring container 150, providing the received output as an input parameter to the executable instructions in the second code 156. The second ML scoring container 150 further includes a model data file stored therein, which is read by the executable instructions in the second code 156 to determine values for the characteristics defining the machine learning model. Execution of the second code 156 results in a second output. The virtual machine instance 142 that initialized the second ML scoring container 150 can then transmit the second output to the model prediction data store 180 and/or the user device 102 via the frontend 149 (e.g., if no more trained machine learning models are needed to generate an output) or transmit the second output to a third ML scoring container 150 initialized in the same or different virtual machine instance 142 (e.g., if outputs from one or more additional trained machine learning models are needed), and the above-referenced process can be repeated with respect to the third ML scoring container 150.

While the virtual machine instances 142 are shown in FIG. 1 as a single grouping of virtual machine instances 142, some embodiments of the present application separate virtual machine instances 142 that are actively assigned to execute tasks from those virtual machine instances 142 that are not actively assigned to execute tasks. For example, those virtual machine instances 142 actively assigned to execute tasks are grouped into an "active pool," while those virtual machine instances 142 not actively assigned to execute tasks are placed within a "warming pool." In some embodiments, those virtual machine instances 142 within the warming pool can be pre-initialized with an operating system, language runtimes, and/or other software required to enable rapid execution of tasks (e.g., rapid initialization of ML scoring container(s) 150, rapid execution of code 156 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 102, the model training system 120, etc.). The processing unit can also communicate to and from a memory of a virtual machine instance 142 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

Additional Embodiments of the Example Training and Hosting Environment

In some embodiments, the operating environment 100 supports many different types of machine learning models, such as multi arm bandit models, reinforcement learning models, ensemble machine learning models, deep learning models, and/or the like.

The model training system 120 and the model hosting system 140 depicted in FIG. 1 are not meant to be limiting. For example, the model training system 120 and/or the model hosting system 140 could also operate within a computing environment having a fewer or greater number of devices than are illustrated in FIG. 1. Thus, the depiction of the model training system 120 and/or the model hosting system 140 in FIG. 1 may be taken as illustrative and not limiting to the present disclosure. For example, the model training system 120 and/or the model hosting system 140 or various constituents thereof could implement various Web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 129 processes all training requests received from user devices 102 and provisions virtual machine instances 122. In some embodiments, the frontend 129 serves as a front door to all the other services provided by the model training system 120. The frontend 129 processes the requests and makes sure that the requests are properly authorized. For example, the frontend 129 may determine whether the user associated with the training request is authorized to initiate the training process.

Similarly, frontend 149 processes all deployment and execution requests received from user devices 102 and provisions virtual machine instances 142. In some embodiments, the frontend 149 serves as a front door to all the other services provided by the model hosting system 140. The frontend 149 processes the requests and makes sure that the requests are properly authorized. For example, the frontend 149 may determine whether the user associated with a deployment request or an execution request is authorized to access the indicated model data and/or to execute the indicated machine learning model.

The training data store 160 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 160 is depicted as being located external to the model training system 120 and the model hosting system 140, this is not meant to be limiting. For example, in some embodiments not shown, the training data store 160 is located internal to at least one of the model training system 120 or the model hosting system 140.

In some embodiments, the training metrics data store 165 stores model metrics. While the training metrics data store 165 is depicted as being located external to the model training system 120 and the model hosting system 140, this is not meant to be limiting. For example, in some embodiments not shown, the training metrics data store 165 is located internal to at least one of the model training system 120 or the model hosting system 140.

The container data store 170 stores container images, such as container images used to form ML training containers 130 and/or ML scoring containers 150, that can be retrieved by various virtual machine instances 122 and/or 142. While the container data store 170 is depicted as being located external to the model training system 120 and the model hosting system 140, this is not meant to be limiting. For example, in some embodiments not shown, the container data store 170 is located internal to at least one of the model training system 120 and the model hosting system 140.

The training model data store 175 stores model data files. In some embodiments, some of the model data files are comprised of a single file, while other model data files are packages of multiple individual files. While the training model data store 175 is depicted as being located external to the model training system 120 and the model hosting system 140, this is not meant to be limiting. For example, in some embodiments not shown, the training model data store 175 is located internal to at least one of the model training system 120 or the model hosting system 140.

The model prediction data store 180 stores outputs (e.g., execution results) generated by the ML scoring containers 150 in some embodiments. While the model prediction data store 180 is depicted as being located external to the model training system 120 and the model hosting system 140, this is not meant to be limiting. For example, in some embodiments not shown, the model prediction data store 180 is located internal to at least one of the model training system 120 and the model hosting system 140.

While the model training system 120, the model hosting system 140, the training data store 160, the training metrics data store 165, the container data store 170, the training model data store 175, and the model prediction data store 180 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 102 via the network 110.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 102 with one or more user interfaces, command-line interfaces (CLI), application programing interfaces (API), and/or other programmatic interfaces for submitting training requests, deployment requests, and/or execution requests. In some embodiments, the user devices 102 can execute a stand-alone application that interacts with the model training system 120 and/or the model hosting system 140 for submitting training requests, deployment requests, and/or execution requests.

In some embodiments, the network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example Block Diagram for Training a Machine Learning Model

Figure 2:
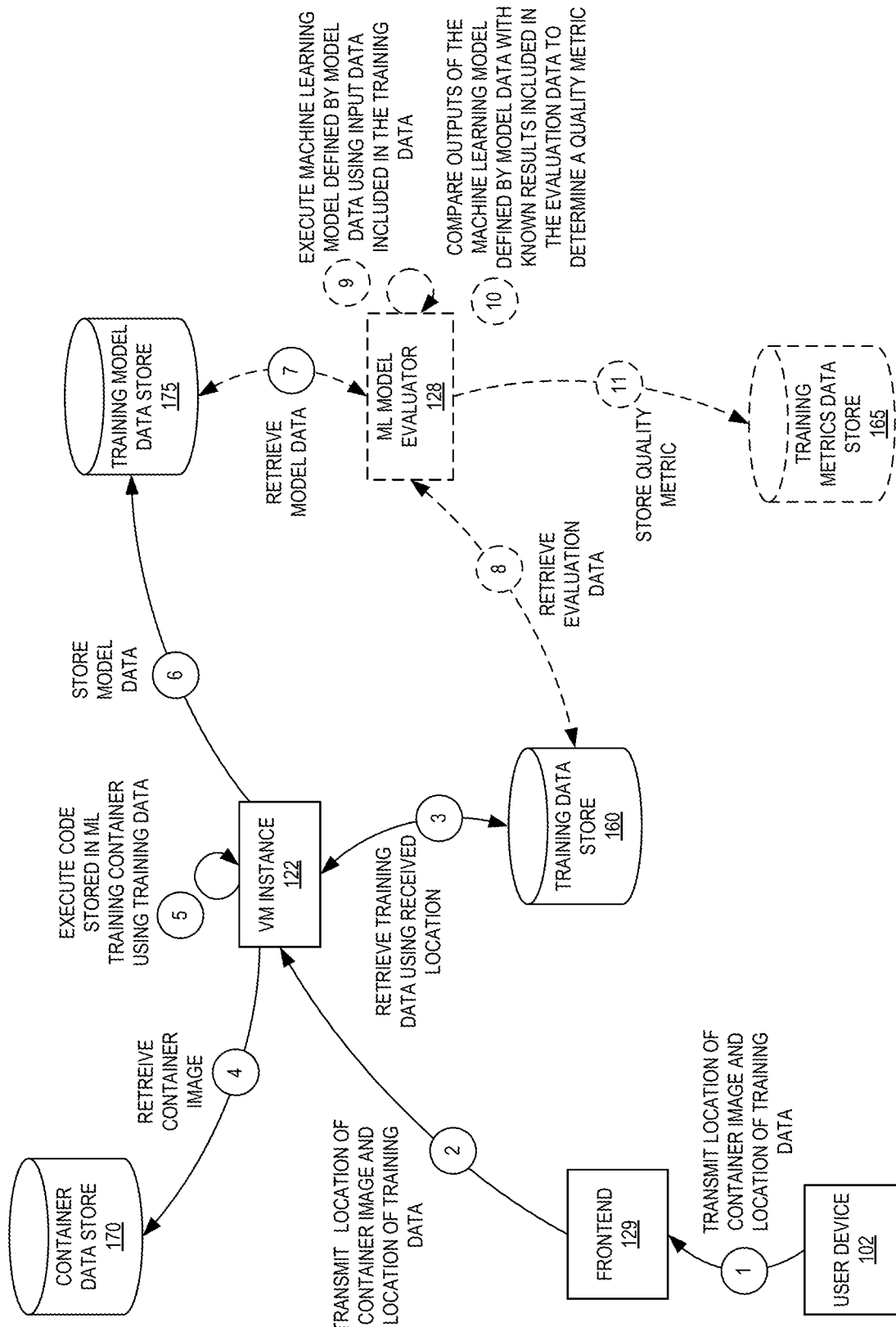
FIG. 2 is a block diagram of the operating environment of FIG. 1 illustrating the operations performed by the components of the operating environment to train a machine learning model, according to some embodiments.

FIG. 2 is a block diagram of the operating environment 100 of FIG. 1 illustrating the operations performed by the components of the operating environment 100 to train a machine learning model, according to some embodiments. As illustrated in FIG. 2, the user device 102 transmits a location of a container image and a location of training data to the frontend 129 at (1). The frontend 129 then causes a virtual machine instance 122 to be initialized and forwards the container image location and the training data location to the initialized virtual machine instance 122 at (2). In some embodiments, the container image location and the training data location are transmitted as part of a training request.

In some embodiments, the virtual machine instance 122 retrieves training data from the training data store 160 using the received location at (3). Before, during, or after retrieving the training data, the virtual machine instance 122 retrieves the container image from the container data store 170 using the received location at (4).

The virtual machine instance 122 initializes an ML training container within the virtual machine instance 122 using the received container image in some embodiments. The virtual machine instance 122 then executes code stored in the ML training container using the retrieved training data at (5) to train a machine learning model. For example, the code can include executable instructions originating in the container image that represent an algorithm that defines a machine learning model that is yet to be trained. The virtual machine instance 122 executes the code according to hyper-parameter values that are provided by the user device 102.

Executing the executable instructions causes the ML training container to generate model data that includes characteristics of the machine learning model being trained. The virtual machine instance 122 stores the model data in the training model data store 175 at (6) in some embodiments. In some embodiments, the virtual machine instance 122 generates multiple model data files that are packaged into a single file stored in the training model data store 175.

During the machine learning model training process, the ML model evaluator 128 can retrieve the model data from the training model data store 175 at (7). The ML model evaluator 128 further retrieves evaluation data from the training data store 160 at (8). For example, the evaluation data can be data that is separate from the data used to train machine learning models. The evaluation data can include input data and known results that occurred or were formed as a result of the input data. In some embodiments, the ML model evaluator 128 executes a machine learning model defined by the retrieved model data using input data included in the evaluation data at (9). The ML model evaluator 128 then compares outputs of the machine learning model defined by the retrieved model data with known results included in the evaluation data to determine a quality metric of the machine learning model at (10). For example, the quality metric can be determined based on an aggregated difference (e.g., average difference, median difference, etc.) between the machine learning model outputs and the known results. The ML model evaluator 128 can then store the quality metric in the training metrics data store 165 at (11).

In some embodiments, the ML model evaluator 128 also stores additional information in the training metrics data store 165. For example, the ML model evaluator 128 can store the input data (or tags that represent the input data), the machine learning model outputs, and the known results. Thus, a user, via the user device 102, can not only identify the quality metric(s), but can also identify which inputs resulted in small or no differences between machine learning model outputs and known results, which inputs resulted in large differences between machine learning model outputs and known results, etc.

Example Block Diagram for Modifying Machine Learning Model Training

Figure 3:
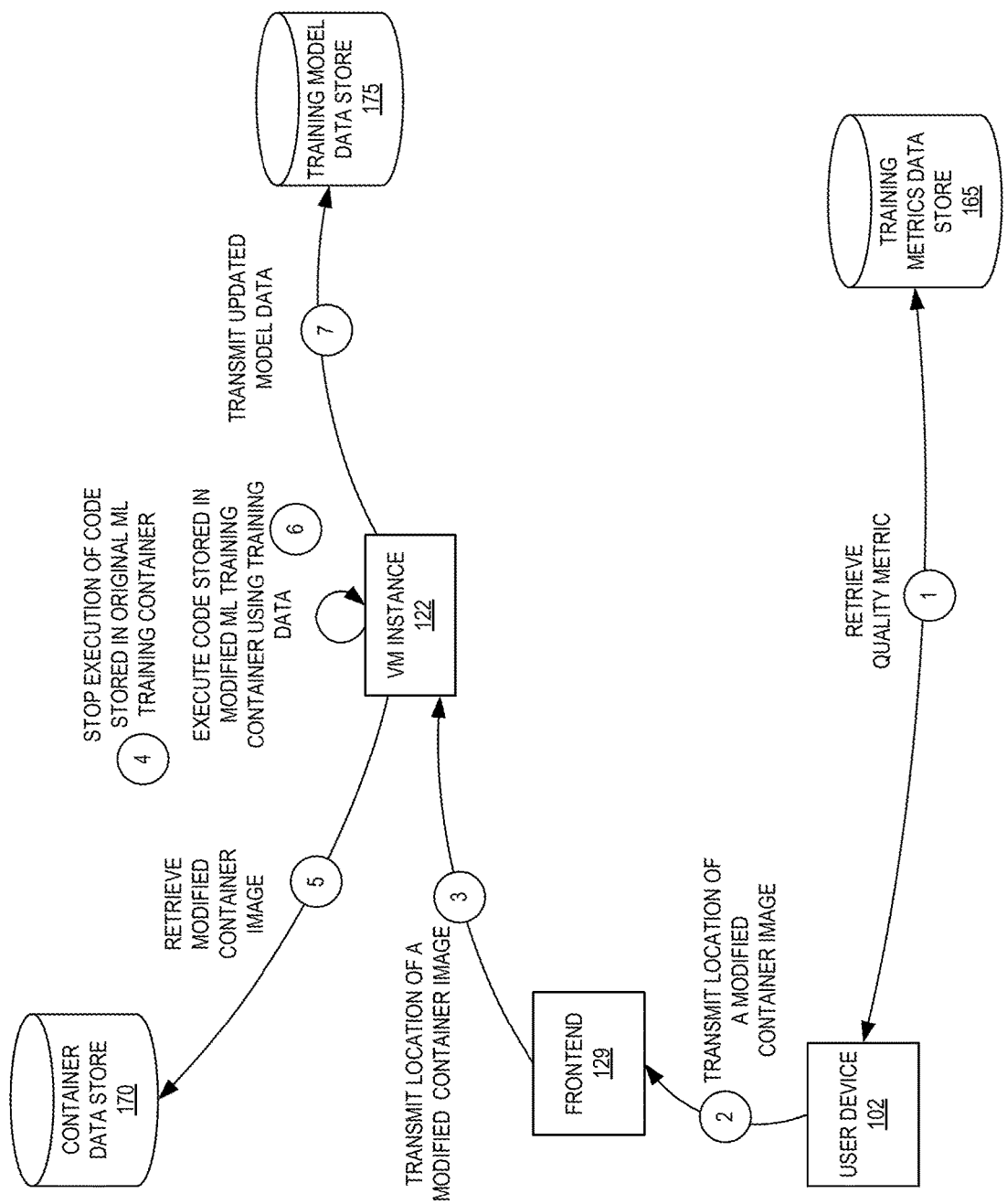
FIG. 3 is a block diagram of the operating environment of FIG. 1 illustrating the operations performed by the components of the operating environment to modifying machine learning model training, according to some embodiments.

FIG. 3 is a block diagram of the operating environment 100 of FIG. 1 illustrating the operations performed by the components of the operating environment 100 to modifying machine learning model training, according to some embodiments. As illustrated in FIG. 3, the user device 102 retrieves a quality metric stored in the training metrics data store 165 at (1). In some embodiments, a user, via the user device 102, retrieves the quality metric to determine the accuracy of a machine learning model still being trained.

In some embodiments, the user device 102 transmits a location of a modified container image to the frontend 129 at (2). The frontend 129 then forwards the location of modified container image to the virtual machine instance 122 at (3). The user device 102 can transmit the modified container image as part of a modification request to modify the machine learning model being trained. In response, the virtual machine instance 122 stops execution of the code stored in the original ML training container formed from the original container image at (4). The virtual machine instance 122 then retrieves the modified container image from the container data store 170 at (5) using the received location. The virtual machine instance 122 can then form a modified ML training container from the modified container image, and execute code stored in the modified ML training container using previously retrieved training data at (6) to re-train a machine learning model.

Execution of the code causes the modified ML training container to generate updated model data, which the virtual machine instance 122 then stores in the training model data store 175 at (7). In some embodiments, not shown, the virtual machine instance 122 causes the training model data store 175 to delete any model data stored as a result of training performed using the original ML training container.

In some embodiments, not shown, while the user desires to modify a machine learning model being trained, the user, via the user device 102, does not provide a location of a modified container image because the user does not want to initialize a new ML training container. Rather, the user desires to modify the existing ML training container at runtime so that the machine learning model can be modified without re-starting the training process. Thus, the user device 102 instead provides code that the virtual machine instance 122 adds to the existing ML training container (or uses to replace other code already existing in the ML training container). For example, the original container image used to form the existing ML training container can include executable instructions that are constructed such that the executable instructions retrieve and execute additional code when executed. Such additional code can be provided by the user device 102 in conjunction with the container image (e.g., when the ML training container is initialized) and/or after the virtual machine instance 122 has already begun to execute code stored within the ML training container. In this embodiment, the container image, together with the additional code, form a complete ML training container.

Example Block Diagram for Parallelized Machine Learning Model Training

Figure 4:
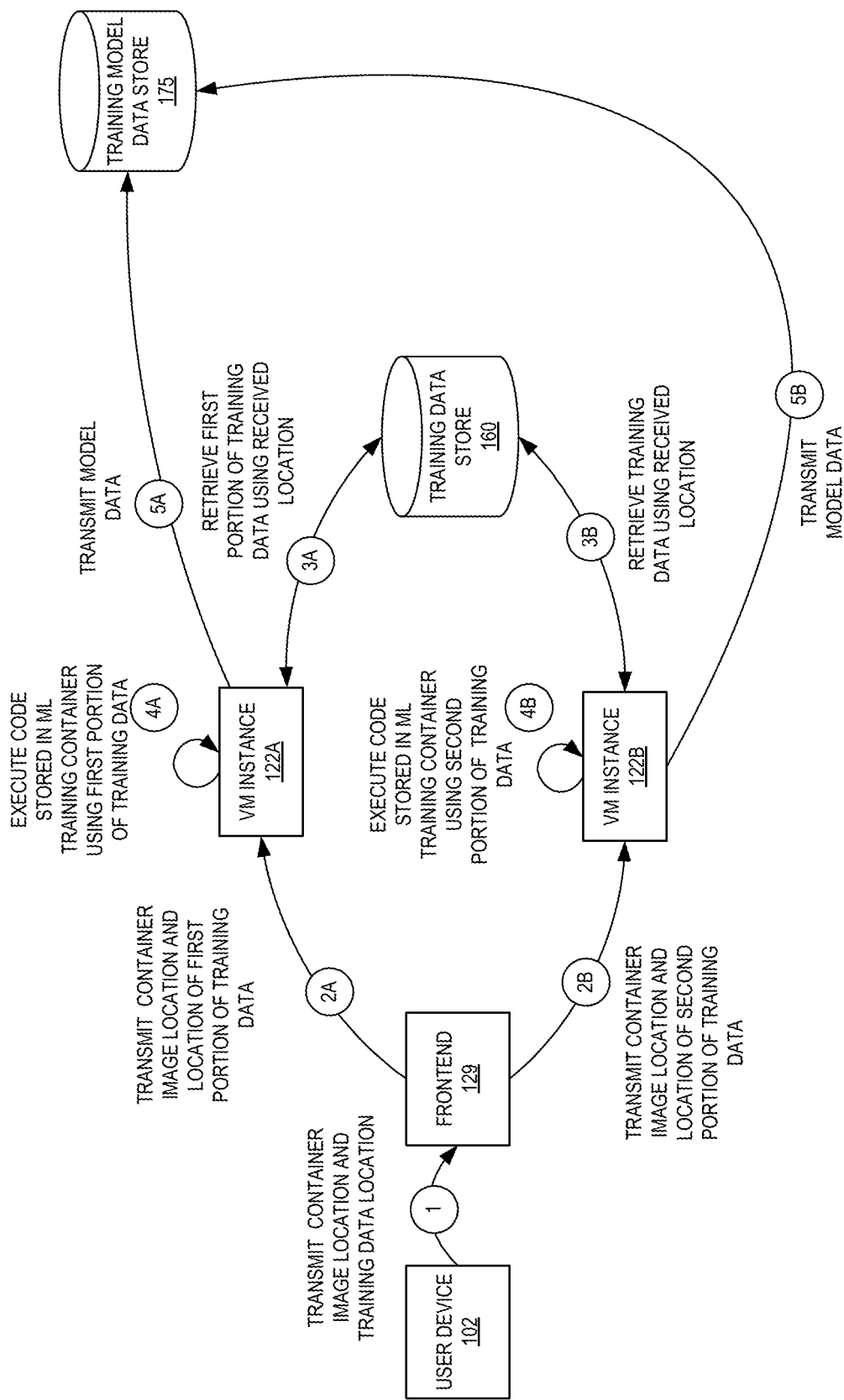
FIG. 4 is a block diagram of the operating environment of FIG. 1 illustrating the operations performed by the components of the operating environment to parallelize the machine learning model training process, according to some embodiments.

FIG. 4 is a block diagram of the operating environment 100 of FIG. 1 illustrating the operations performed by the components of the operating environment 100 to parallelize the machine learning model training process, according to some embodiments. As illustrated in FIG. 4, user device 102 transmits a container image location and a training data location to the frontend 129 at (1). In response, the frontend 129 initializes a first virtual machine instance 122A and a second virtual machine instance 122B such that the first virtual machine instance 122A can perform a partial training of a machine learning model using a first portion of the training data and the second virtual machine instance 122B can perform a partial training of the machine learning model using a second portion of the training data. The frontend 129 then transmits the container image location and the location of a first portion of the training data to the virtual machine instance 122A at (2A). Before, during, or after transmitting the container image location and the location of the first portion of the training data to the virtual machine instance 122A, the frontend 129 transmits the container image location and the location of a second portion of the training data to the virtual machine instance 122B at (2B). In some embodiments, the container image location and the training data location are transmitted as part of training requests.

In some embodiments, the virtual machine instance 122A retrieves the first portion of the training data from the training data store 160 using the received location at (3A). Before, during, or after the virtual machine instance 122A retrieves the first portion of the training data, the virtual machine instance 122B retrieves the second portion of the training data from the training data store 160 using the received location at (3B). In some embodiments, not shown, the virtual machine instances 122A-122B retrieve the same training data.

The virtual machine instance 122A then forms an ML training container using a container image retrieved from the indicated location in some embodiments, and executes code stored in the ML training container using the retrieved first portion of the training data at (4A). Before, during, or after the virtual machine instance 122A executes the code, the virtual machine instance 122B forms an ML training container using a container image retrieved from the indicated location and executes code stored in the ML training container using the retrieved second portion of the training data at (4B). Thus, the virtual machine instances 122A-122B each include a copy of the same ML training container.

Executing the code causes the virtual machine instances 122A-122B (e.g., the ML training containers included therein) to generate model data. Thus, the virtual machine instance 122A transmits model data to the training model data store 175 at (5A) and the virtual machine instance 122B transmits model data to the training model data store 175 at (5B). In some embodiments, not shown, the model data generated by each virtual machine instance 122A-122B is packaged into a single model data file (e.g., by the training model data store 175).

In some embodiments, the virtual machine instances 122A-122B communicate with each other during the machine learning model training. For example, the virtual machine instances 122A-122B can share coefficients, weights, training strategies, and/or the like during the training process.

Example Block Diagram for Deploying and Executing a Machine Learning Model

Figure 5A:
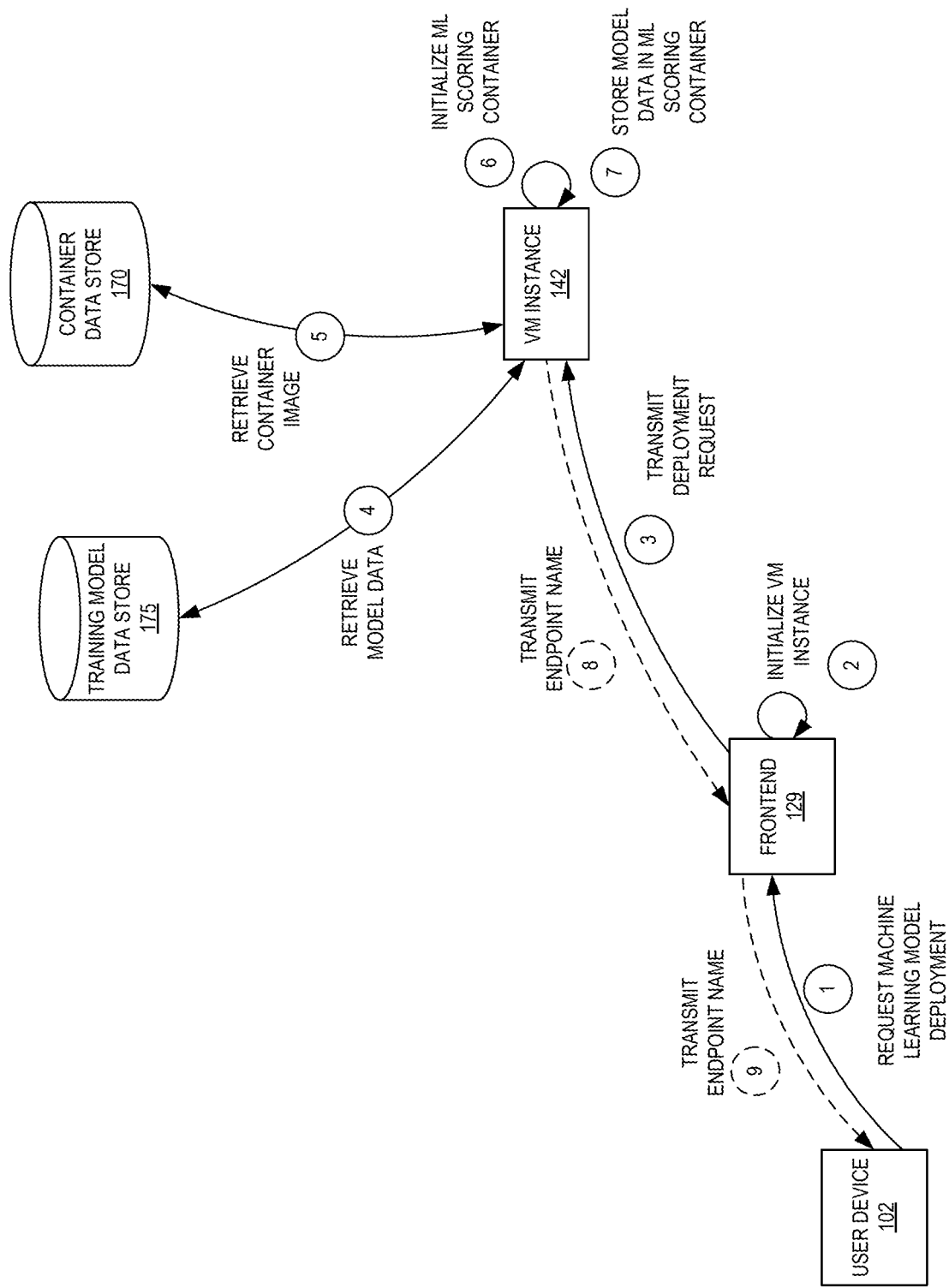
FIG. 5A is a block diagram of the operating environment of FIG. 1 illustrating the operations performed by the components of the operating environment to deploy a trained machine learning model, according to some embodiments.

FIG. 5A is a block diagram of the operating environment 100 of FIG. 1 illustrating the operations performed by the components of the operating environment 100 to deploy a trained machine learning model, according to some embodiments. As illustrated in FIG. 5A, user device 102 transmits a machine learning model deployment request to the frontend 149 at (1). The frontend 149 can initialize a virtual machine instance 142 at (2) and transmit the deployment request to the virtual machine instance 142 at (3). The deployment request includes a location of one or more model data files stored in the training model data store 175. In some embodiments, the deployment request includes an endpoint name. In some embodiments, the deployment request does not include an endpoint name.

In some embodiments, the virtual machine instance 142 retrieves model data from the training model data store 175 at (4). For example, the virtual machine instance 142 retrieves the model data corresponding to the location identified in the deployment request. In some embodiments, not shown, the virtual machine instance 142 does not retrieve the model data. Rather, the model data can be embedded in the container image retrieved by the virtual machine instance 142. The virtual machine instance 142 also retrieves a container image from the container data store 170 at (5).

The container image can correspond to a container image identified in the deployment request.

The virtual machine instance 142 can initialize an ML scoring container at (6) in some embodiments. For example, the virtual machine instance 142 can form the ML scoring container using the retrieved container image. The virtual machine instance 142 can further store the model data in the ML scoring container (e.g., in a location that is the same as the location in which the model data is stored in an ML training container 130 when a machine learning model is trained) at (7).

In some embodiments, if the deployment request did not include an endpoint name, the virtual machine instance 142 can transmit an endpoint name to the frontend 149 at (8). The frontend 149 can then forward the endpoint name to the user device 102 at (9). Thus, the user device 102 can use the endpoint name to access the initialized ML scoring container in the future (e.g., to submit a machine learning model execution request).

Figure 5B:
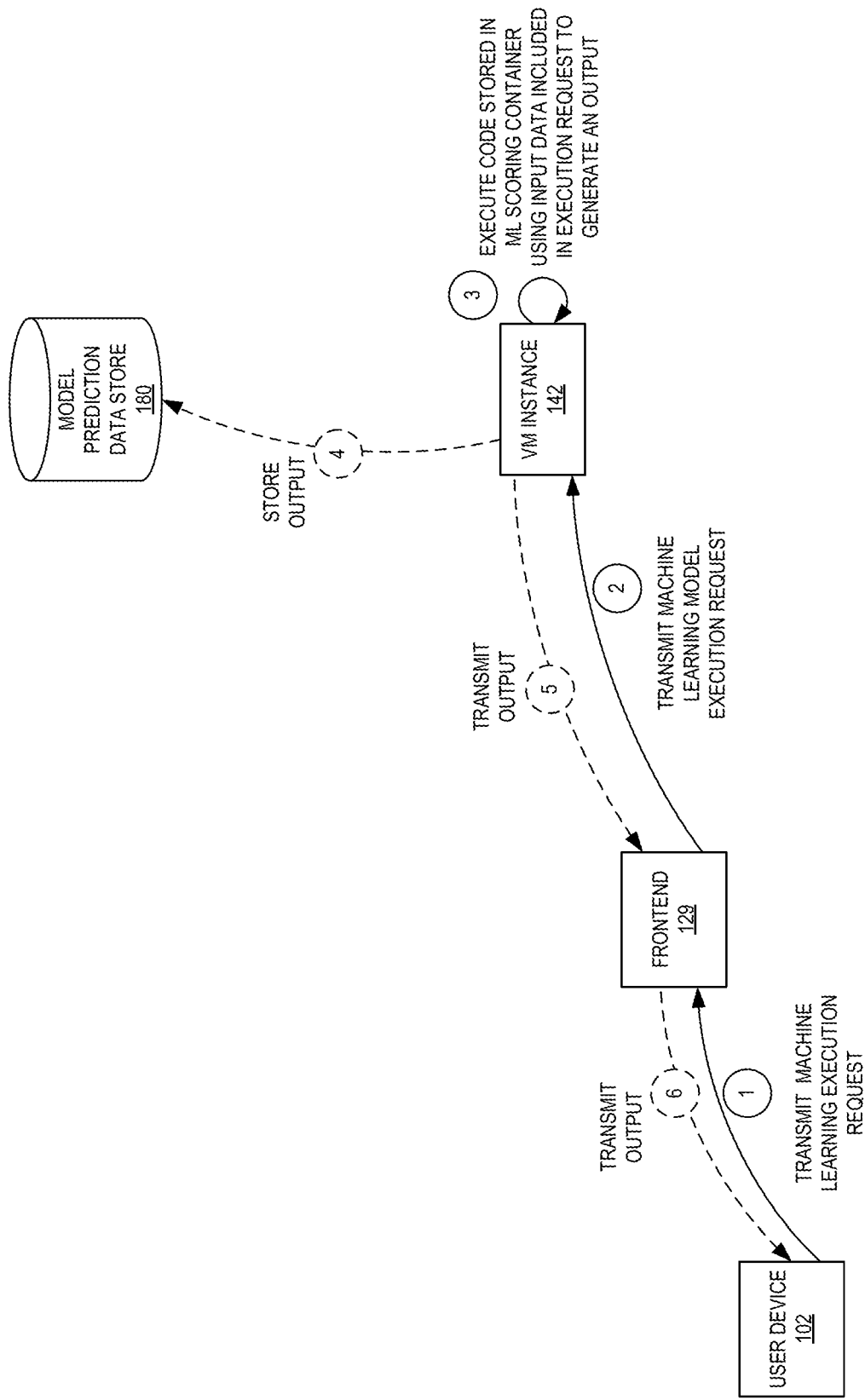
FIG. 5B is a block diagram of the operating environment of FIG. 1 illustrating the operations performed by the components of the operating environment to execute a trained machine learning model, according to some embodiments.

FIG. 5B is a block diagram of the operating environment 100 of FIG. 1 illustrating the operations performed by the components of the operating environment 100 to execute a trained machine learning model, according to some embodiments. As illustrated in FIG. 5B, user device 102 transmits a machine learning model execution request to the frontend 149 at (1). The frontend 149 then forwards the execution request to the virtual machine instance 142 at (2). In some embodiments, the execution request includes an endpoint name, which the model hosting system 140 uses to route the execution request to the appropriate virtual machine instance 142.

In some embodiments, the virtual machine instance 142 executes code stored in an ML scoring container initialized in the virtual machine instance 142 using input data included in the execution request to generate an output at (3). In some embodiments, the virtual machine instance 142 stores the output in the model prediction data store 180 at (4). Alternatively or in addition, the virtual machine instance 142 transmits the output to the frontend 149 at (5), and the frontend 149 transmits the output to the user device 102 at (6).

Example Block Diagram for Executing Related Machine Learning Models

Figure 6:
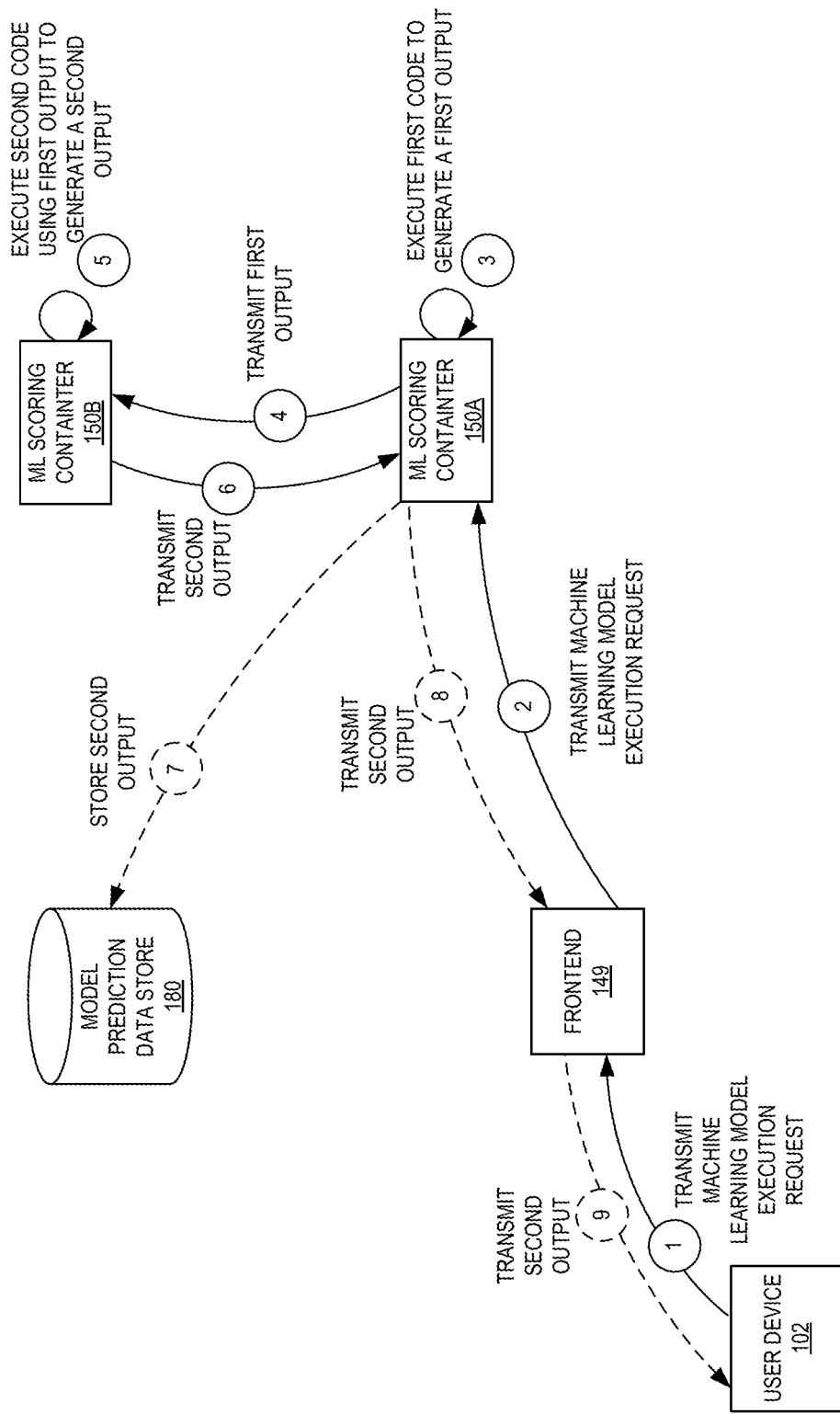
FIG. 6 is a block diagram of the operating environment of FIG. 1 illustrating the operations performed by the components of the operating environment to execute related machine learning models, according to some embodiments.

FIG. 6 is a block diagram of the operating environment 100 of FIG. 1 illustrating the operations performed by the components of the operating environment 100 to execute related machine learning models, according to some embodiments. As illustrated in FIG. 6, user device 102 transmits a machine learning model execution request to the frontend 149 at (1). The frontend 149 then forwards the execution request to a first ML scoring container 150A initialized in a virtual machine instance 142 at (2). In some embodiments, the execution request can include a request for an output from a second machine learning model executed by a second ML scoring container 150B initialized in the virtual machine instance 142. However, to generate an output, the ML scoring container 150B needs data from the execution of a first machine learning model executed by the ML scoring container 150A. Thus, the virtual machine instance 142 initially routes the execution request to the ML scoring container 150A. In some embodiments, the ML scoring container 150A servers as a master container, managing communications to and from other ML scoring containers (e.g., ML scoring container 150B).

In some embodiments, virtual machine instance 142 causes the ML scoring container 150A to execute first code to generate a first output at (3). For example, execution of the first code represents the execution of a first machine learning model using input data included in the execution request. The ML scoring container 150A then transmits the first output to the ML scoring container 150B at (4).

The virtual machine instance 142 then causes the second ML scoring container 150B to execute second code using the first output to generate a second output at (5). For example, execution of the second code represents the execution of a second machine learning model using the first output as an input to the second machine learning model. The second ML scoring container 150B then transmits the second output to the first ML scoring container 150A at (6).

In some embodiments, the virtual machine instance 142 pulls the second output from the first ML scoring container 150A and stores the second output in the model prediction data store 180 at (7). Alternatively or in addition, the virtual machine instance 142 pulls the second output from the first ML scoring container 150A and transmits the second output to the frontend 149 at (8). The frontend 149 then transmits the second output to the user device 102 at (9).

In some embodiments, not shown, the ML scoring containers 150A-150B are initialized in different virtual machine instances 142. Thus, the transmissions of the first output and the second output can occur between virtual machine instances 142.

Example Machine Learning Model Accuracy Improvement Routine

Figure 7:
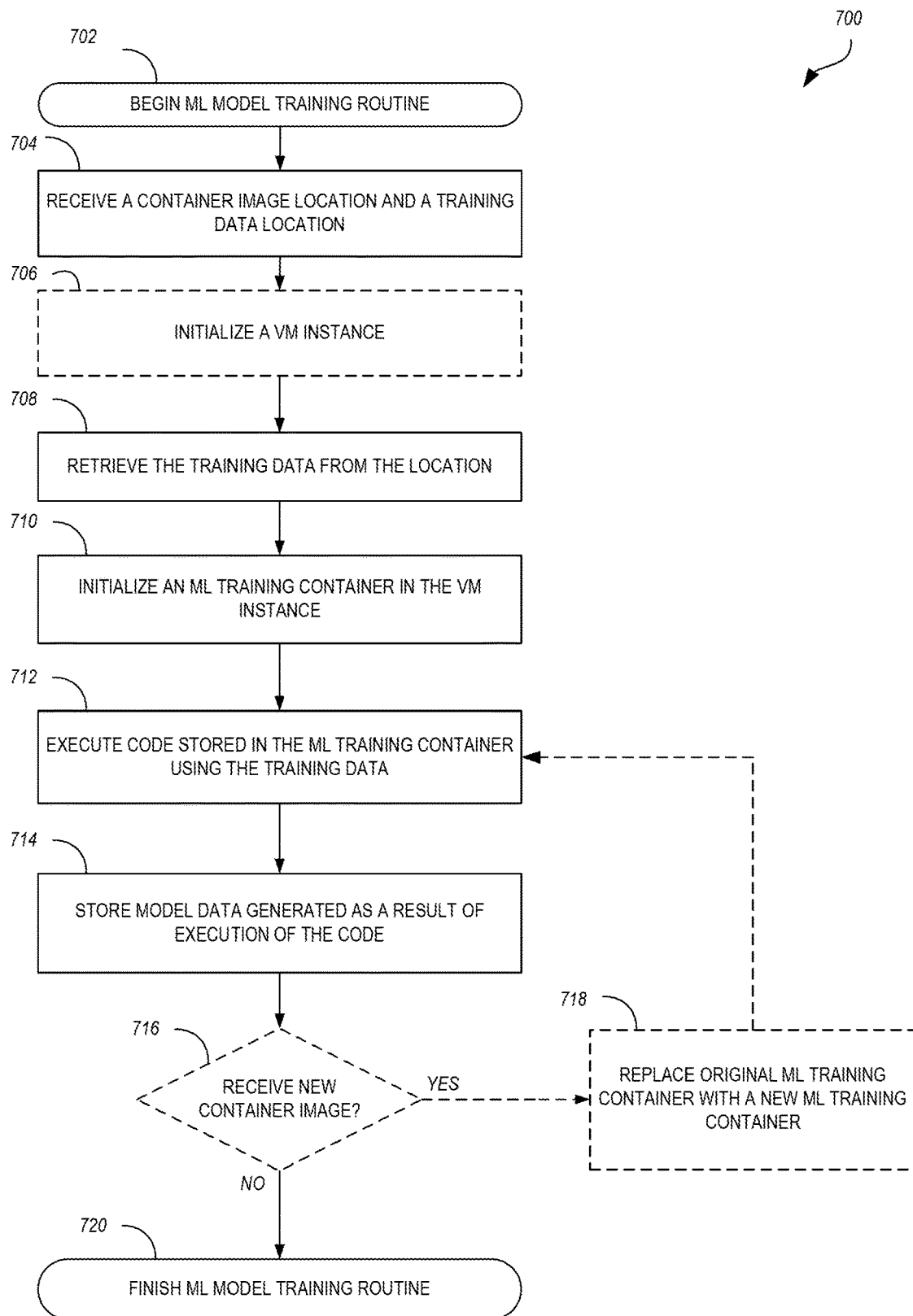
FIG. 7 is a flow diagram depicting a machine learning model training routine illustratively implemented by a model training system, according to some embodiments.

FIG. 7 is a flow diagram depicting a machine learning model training routine 700 (e.g., a method) illustratively implemented by a model training system, according to some embodiments. As an example, the model training system 120 of FIG. 1 can be configured to execute the machine learning model training routine 700. The machine learning model training routine 700 begins at block 702.

At block 704, in some embodiments, a container image location and a training data location are received. For example, the container image location and the training data location are received as part of a training request.

At block 706, in some embodiments, a virtual machine instance is initialized. For example, the initialized virtual machine instance is the instance that will perform the machine learning model training.

At block 708, in some embodiments, the container image and training data are retrieved. For example, the container image can be retrieved from the container data store 170 and the training data can be retrieved from the training data store 160.

At block 710, in some embodiments, an ML training container is initialized in the virtual machine instance. For example, the ML training container is formed using the received container image. The container image includes executable instructions that define an algorithm. Thus, the ML training container includes code that includes executable instructions that define an algorithm.

At block 712, in some embodiments, code stored in the ML training container is executed using the retrieved training data. For example, the retrieved training data (e.g., input data in the training data) is supplied as inputs to the executable instructions that define the algorithm (e.g., using as values for input parameters of the executable instructions).

At block 714, in some embodiments, model data generated as a result of execution of the code is stored. For example, the model data is stored in the training model data store 175. Model data can be periodically generated during the machine learning model training process.

At block 716, in some embodiments, a determination is made as to whether anew container image is received during the machine learning model training process. If a new container image is received, the machine learning model training routine 700 proceeds to block 718. Otherwise, if no new container image is received during the machine learning model training process, the machine learning model training routine 700 proceeds to block 720 and ends.

At block 718, in some embodiments, the original ML training container is replaced with a new ML training container. For example, the new ML training container is formed using the new container image. Once the original ML training container is replaced, the machine learning model training routine 700 proceeds back to block 712 such that code stored in the new ML training container is executed using the training data.

In some embodiments, not shown, anew container image is not received. However, one or more new hyperparameters (e.g., a change to the number of clusters, a change to the number of layers, etc.), new code, and/or the like is received. The model training system 120 can modify the original ML training container during runtime (instead of replacing the original ML training container with a new ML training container) to train the machine learning model using the new hyperparameter(s), using the new code, and/or the like.

Example Architecture of Model Training and Hosting Systems

Figure 8:
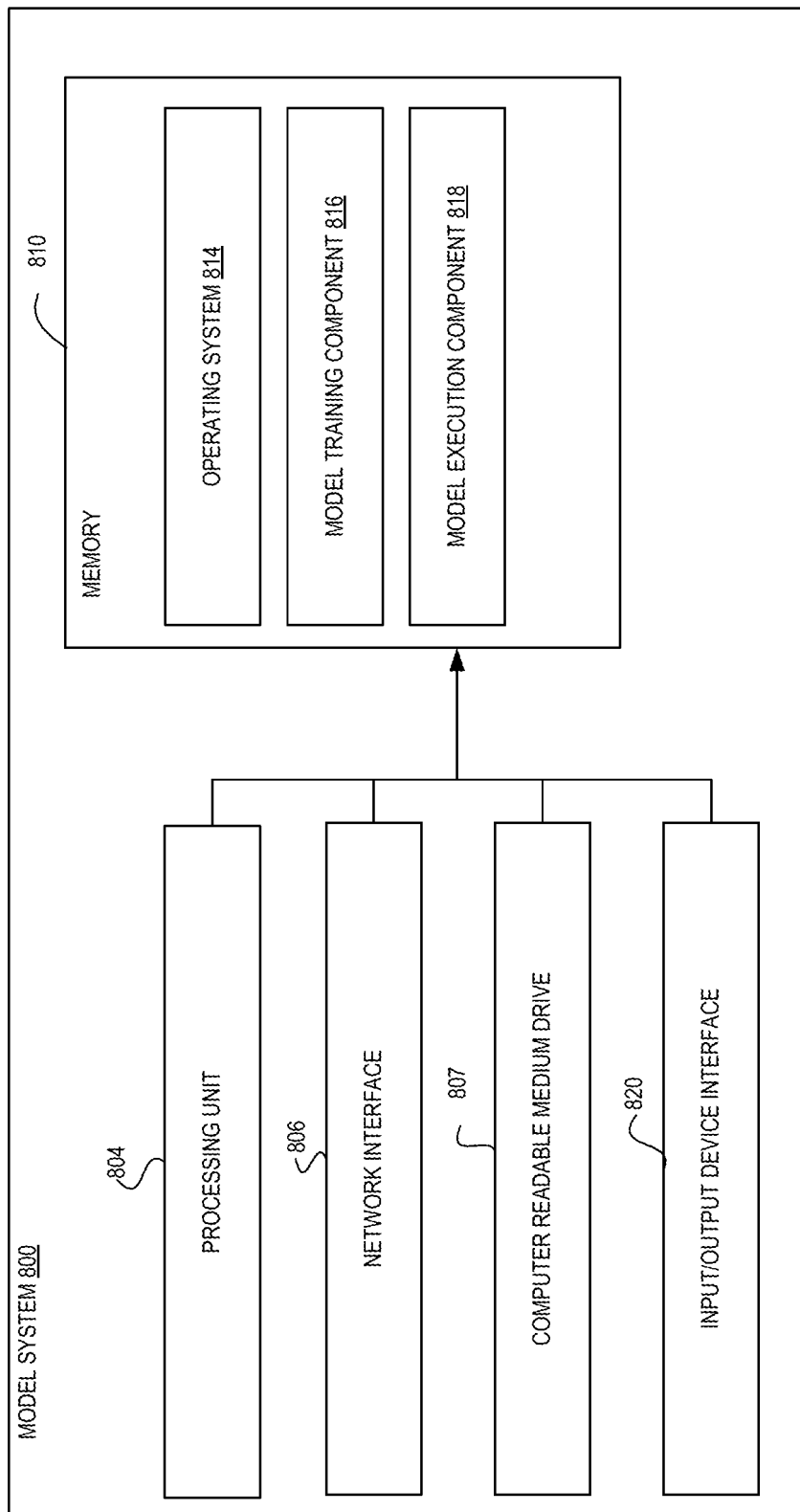
FIG. 8 depicts some embodiments of an architecture of an illustrative model system, such as the model training system and the model hosting system, that train and/or host machine learning models in accordance with the present application.

FIG. 8 depicts some embodiments of an architecture of an illustrative model system 800, such as the model training system 120 and the model hosting system 140, that train and/or host machine learning models in accordance with the present application. The general architecture of the model system depicted in FIG. 8 includes an arrangement of computer hardware and software components that can be used to implement aspects of the present disclosure. As illustrated, the model system 800 includes a processing unit 804, a network interface 806, a computer-readable medium drive 807, an input/output device interface 820, all of which may communicate with one another by way of a communication bus.

In some embodiments, the network interface 806 provides connectivity to one or more networks or computing systems, such as the network 110 of FIG. 1. The processing unit 804 can thus receive information and instructions from other computing systems or services via a network. The processing unit 804 can also communicate to and from memory 810 and further provide output information. In some embodiments, the model system 800 includes more (or fewer) components than those shown in FIG. 8.

In some embodiments, the memory 810 includes computer program instructions that the processing unit 804 executes in order to implement one or more embodiments. The memory 810 generally includes RAM, ROM, or other persistent or non-transitory memory. The memory 810 can store an operating system 814 that provides computer program instructions for use by the processing unit 804 in the general administration and operation of the functionality implemented by the model training system 120 and/or the model hosting system 140. The memory 810 can further include computer program instructions and other information for implementing aspects of the present disclosure. For example, in some embodiments, the memory 810 includes a model training component 816 that corresponds to functionality provided by the model training system 120 illustrated in FIG. 1. In some embodiments, the memory 810 includes a model execution component 818 that corresponds to functionality provided by the model hosting system 140.

Example Architecture of an End User Device

Figure 9:
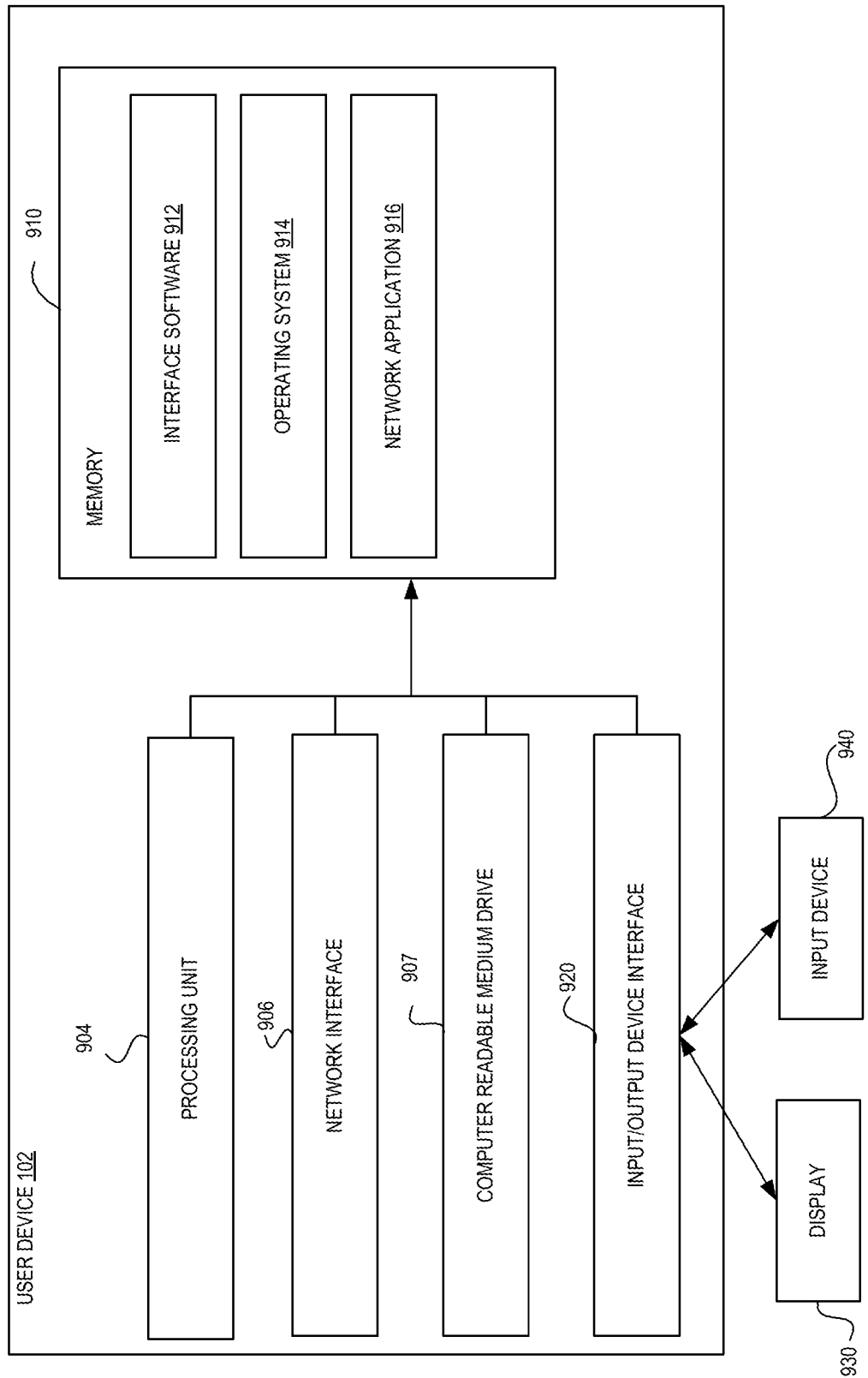
FIG. 9 depicts some embodiments of an architecture of an illustrative end user device that can receive data, prepare data, transmit training requests to the model training system, and transmit deployment and/or execution requests to the model hosting system in accordance with the present application.

FIG. 9 depicts some embodiments of an architecture of an illustrative end user device 102 that can receive data, prepare data, transmit training requests to the model training system 120, and transmit deployment and/or execution requests to the model hosting system 140 in accordance with the present application. The general architecture of the end user device 102 depicted in FIG. 9 includes an arrangement of computer hardware and software components that can be used to implement and access aspects of the present disclosure. As illustrated, the end user device 102 includes a processing unit 904, a network interface 906, a computer readable medium drive 907, an input/output device interface 920, an optional display 930, and an input device 940, all of which may communicate with one another by way of a communication bus.

In some embodiments, the network interface 906 provides connectivity to one or more networks or computing systems, such as the network 110 of FIG. 1. The processing unit 904 can thus receive information and instructions from other computing systems or services via a network. The processing unit 904 can also communicate to and from memory 910 and further provide output information for the optional display 930 via the input/output device interface 920. The input/output device interface 920 can also accept input from the optional input device 940, such as a keyboard, mouse, digital pen, touchscreen, etc. In some embodiments, the end user devices 102 include more (or fewer) components than those shown in FIG. 9.

In some embodiments, the memory 910 includes computer program instructions that the processing unit 904 executes in order to receive data, prepare data, and transmit the requests described herein. The memory 910 generally includes RAM, ROM, or other persistent or non-transitory memory. The memory 910 can store an operating system 914 that provides computer program instructions and interface software 912 for use by the processing unit 904 in the general administration and operation of the end user device 102. The memory 910 can further include computer program instructions and other information for implementing aspects of the present disclosure. For example, in some embodiments, the memory 910 includes a network application 916, such as browser application, media player, CLI, stand-alone application, etc., for accessing content and communicating with the model training system 120 and/or the model hosting system 140.

Machine Learning Service Detail

Figure 10:
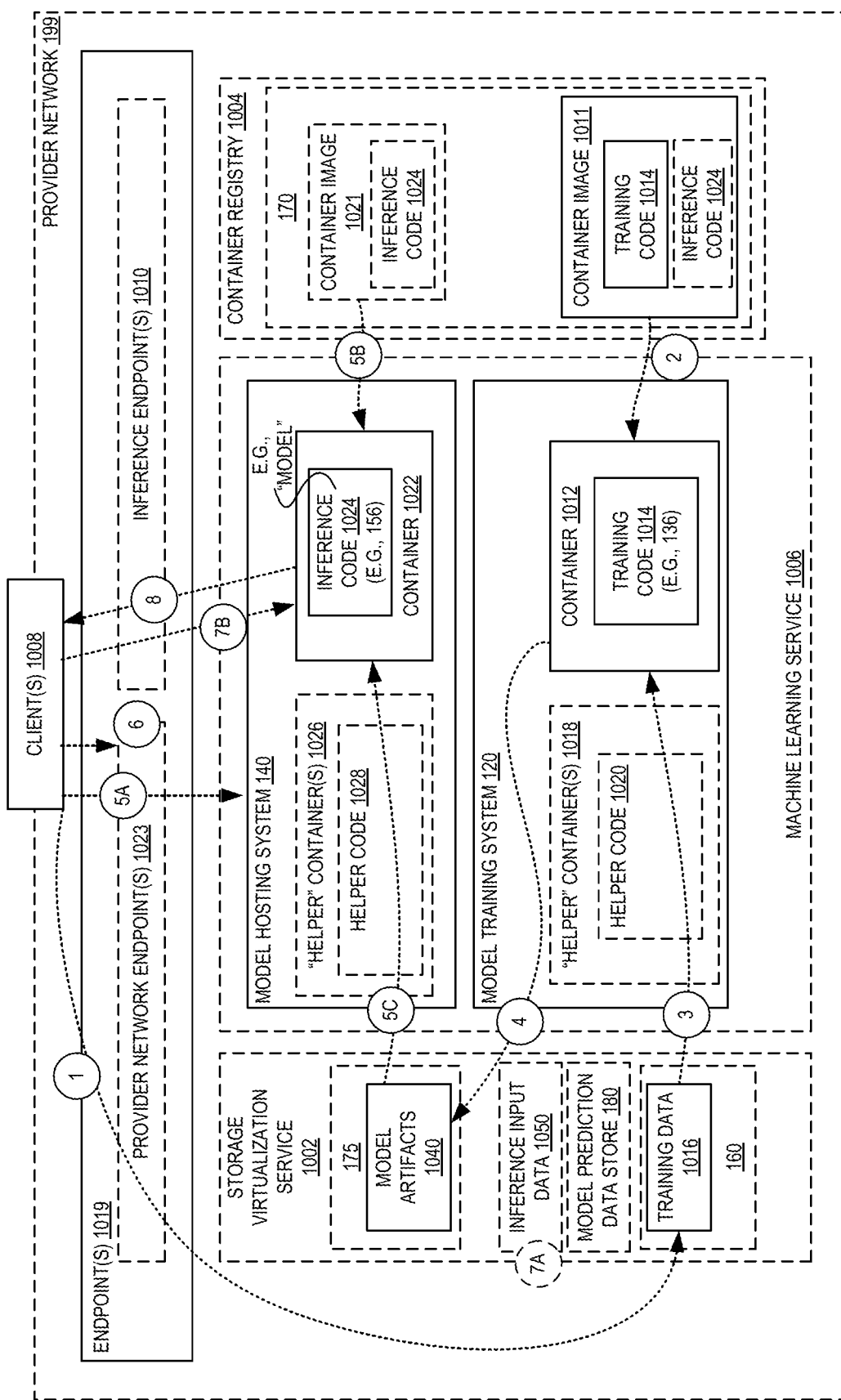
FIG. 10 is a block diagram of illustrative components of a machine learning service according to some embodiments.

FIG. 10 is a block diagram of illustrative components of a machine learning service 1006 according to some embodiments. The components of FIG. 10 may be a part of a provider network 199, and may be thought of as belonging to (or being provided by) parts of a storage virtualization service 1002, a machine learning service 1006, and a container registry 1004.

In some embodiments, users can train and/or utilize machine learning models via the use of containerization techniques as described herein. The machine learning models can utilize "out-of-the-box" standard algorithms provided by the machine learning service 1006, such as linear learner (binary classifier) algorithms, XGBoost algorithms, factorization machines algorithms, k-means algorithms, principal component analysis (PCA) algorithms, image classification algorithms, sequence-to-sequence algorithms, latent dirichlet allocation (LDA) algorithms, "deep" models such as artificial neural network models (e.g., convolutional neural networks (CNNs), recurrent neural networks (RNNs)), etc. In some embodiments, the machine learning models may be "custom" algorithms developed by users, and/or use custom code to train using existing algorithms such as deep learning frameworks (e.g., TensorFlow, Apache MXNet, etc.).

For example, in some embodiments, users are able to write arbitrary pieces of code for machine learning, and using a defined packaging mechanism, the users can "inject" their code into a machine learning environment (e.g., provided by machine learning service 1006), where the models can seamlessly be trained (e.g., in model training system 120) based on training data 1016, and the resulting models may or may not thereafter be deployed in a hosted environment (e.g., model hosting system 140). With these hosted models (e.g., inference code 1024 executed by a container 1022), client applications 1008—whether hosted within the provider network 199 or external to the provider network 199—can issue requests via one or more inference endpoints 1010 (e.g., as HTTP requests) to perform inference using the model.

Accordingly, in some embodiments, the training and/or hosting of machine learning models can be performed without needing significant knowledge on the part of users as to how these models are to be trained or used. For example, in some embodiments users can select or create a container including machine learning related code—potentially using any language(s)/package(s) that the user desires—that adheres to a specification (or a "schema") proscribed by the machine learning service 1006. With a container that follows this specification, the machine learning service 1006 can transparently implement all of the training and/or hosting of the model without specific user instructions or knowledge of how these tasks are being performed.

In some embodiments, a user can directly or indirectly construct a container image 1011 that encapsulates the user's desired ML algorithm (or "training code" 1014, which can define a kind of model (linear equation, categorization, deep learning, etc.)) and that adheres to the specification. The user can send the container image 1011 (or create the container image 1011 within the provider network 199) to the provider network 199—e.g., to a container registry 1004 to be stored. Optionally, the container image 1011 may include inference code 1024 as described later herein. The user may upload training data 1016 to the provider network 199 (or cause the provider network 199 to obtain the training data) at circle '1', which may be stored in a storage location (e.g., a storage "bucket" of storage virtualization service 1002)), and can issue a request to begin the training process (not illustrated), and thus the container 1012 is run in the model training system 120 at circle '2' based on the container image 1011.

The request to begin the training process can be an API call issued to an endpoint 1019 (e.g., a provider network endpoint 1019) of the provider network 199. This request, or "CreateTrainingJob" request, indicates the user's desire to start a model training job, and is provided to the machine learning service 1006. Upon the conclusion of the job, the machine learning service 1006 may save resulting model artifacts to a storage location (e.g., of storage virtualization service 1002) specified in the request. In some embodiments, a user may decide to host this model using the model hosting system 140, in which case these model artifacts can be used as part of the model, though in some embodiments a user can also use the model artifacts in a deep learning service other than the machine learning service 1006. The model artifacts can include one or more of: one or more files including values that serve as weights/coefficients for a particular ML algorithm (e.g., weights for a neural network), values serving as centroids for a model (e.g., a k-means clustering model), a shape of an equation, or other model-specific information allowing a model to be utilized (e.g., indicators of where tree splits exists for tree-based models, etc.).

In some embodiments, a CreateTrainingJob request message indicates one or more values. The one or more values may include an "AlgorithmSpecification" value that identifies the training algorithm to use (e.g., a location/path of the container image 1011 that contains the training algorithm 1014 and algorithm-specific metadata, and identifies an input mode for training data to be provided to the container (e.g., as files, as named pipes). The one or more values may include a "HyperParameters" value that specifies the algorithm-specific parameters (e.g., in the form of key-value pairs) to be used to influence the quality of the final model. The one or more values may include an "InputDataConfig" value that describes the training dataset (e.g., a number of input channels of the data, a MIME type of the data, compression method, data format, etc.) and the storage location (e.g., within the storage virtualization service 1002) where it is stored. The one or more values may include an "OutputDataConfig" value that identifies a storage location where the user desires the results (e.g., "model artifacts") of the model training to be stored. The one or more values may include a "ResourceConfig" value that identifies the resources, ML compute instances, and/or ML storage volumes to deploy for model training. For example, some embodiments provide distributed training, where a user can specify as part of the ResourceConfig element more than one instance is to be used for training. The one or more values may include a "RoleARN" value that indicates a role or set of permissions to be used by the machine learning service 106 for training (e.g., to access data from the storage virtualization service 1002). The one or more values may include a "StoppingCondition" value that indicates a duration for the training that, for example, can be used to cap the model training time or cost.

In response to the request, the machine learning service 1006 can send back an acknowledgement (e.g., a response, which may include a resource name of the created training job) to the client 1008.

Thus, the container 1012 can be "automatically" provided the necessary training data 1016 at circle '3' (e.g., from a storage virtualization service 1002 location, which the user may have uploaded) via one or more "helper" containers 1018 including helper code 1020 that pulls the training data 1016 from the storage virtualization service 1002 to the container 1012. Thus, the training code 1014 need not know anything about where the training data 1016 comes from, or where the model artifacts 1040 go to, as the helper containers 1018 may handle this transparently. Accordingly, the "helper" containers 1018 may provide useful support functions for the container 1012 so that the container 1012 can beneficially remain ignorant to all of these functionalities (e.g., data acquisition and storage, logging, responding to API-type calls, etc.) to enable users to easily create containers 1012 that are focused specifically on the machine learning task at hand.

Figure 11:
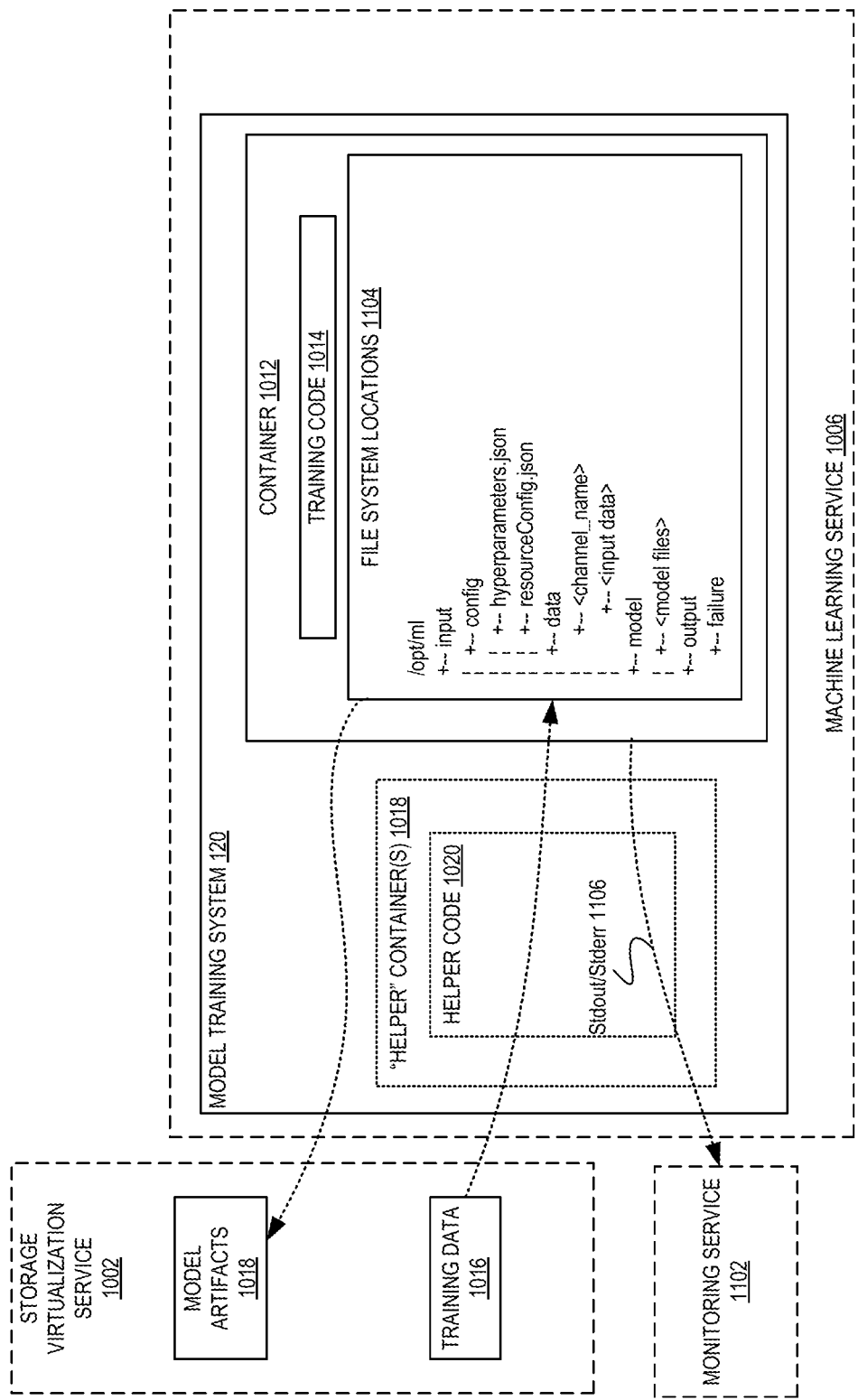
FIG. 11 is a block diagram illustrating container support operations for model training according to some embodiments.

For example, FIG. 11 is a block diagram illustrating container support operations for model training according to some embodiments. In some embodiments, a container 1012 that adheres to the specification defined by the model training system 120 can be served by helper code 1020 for input and/or output operations.

For example, in some embodiments when a user submits a CreateTrainingJob request to the machine learning service to start model training, the user specifies a resource location of the container image that provides the training algorithm. The user may also specify the storage locations where training data is stored and/or algorithm-specific parameters are stored. The model training system 120, via helper code 1020, can provide this data to the container 1012 so that the training code 1014 can use it.

For example, the specification may stipulate one or more file system locations 1104 that the container (or, training code 1014) is to use to read and/or write information to.

As one example, the model training system 120 can make hyperparameters identified in a CreateTrainingJob request available to the container 1012 at a file system location 1104 of /opt/ml/input/config/hyperparameters.json. As another example, a user may specify data channel information in an InputDataConfig parameter in a CreateTrainingJob request, and the model training system 120 can make this information available in the /opt/ml/input/config/inputdataconfig.json file in the container. Techniques for making objects (e.g., files) locally available to a container's filesystem are known to those of skill in the art—e.g., via use of a command (e.g., an ADD or COPY command of Docker) supported by a containerization platform.

As another example, a TrainingInputMode parameter in a CreateTrainingJob request may specify how to make data available for model training, e.g., in FILE mode or PIPE mode. If FILE mode is specified, the model training system 120 can make the data for the channel available in the /opt/ml/input/data/channel_name directory in the container. For example, if a user specifies three channels named training, validation, and testing, model training system 120 can make three directories in the container:

/opt/ml/input/data/training
/opt/ml/input/data/validation
/opt/ml/input/data/testing If PIPE mode is specified, the model training system 120 can make data for the channel available from the named pipe: /opt/ml/input/data/channel_name_epoch_number. For example, if a user specifies three channels named training, validation, and testing, the training code 1014 may sequentially read from the following pipes:

/opt/ml/input/data/training_0, /opt/ml/input/data/training_1, ... et seq.
/opt/ml/input/data/validation_0, /opt/ml/input/data/validation_1, ... et seq.
/opt/ml/input/data/testing_0, /opt/ml/input/data/testing_1, ... et seq.

As another example, in some embodiments supporting distributed training with multiple containers, the model training system 120 can make information about all containers available in the /opt/ml/input/config/resourceConfig.json file. For example, to enable inter-container communication, this file (e.g., a JSON-formatted file) may contain Domain Name Service (DNS) information for all involved containers, and may include one or more of a "current_host" value representing the name of the current container on the container network (e.g., "algo-1"), and may include one or more "hosts" values indicating a list of DNS names of all containers on the container network, e.g., sorted lexicographically, such as ["algo-1", "algo-2", "algo-3"] for a three-node cluster that can be used by containers to address other containers in the container network.

Further, in some embodiments, as an algorithm runs in a container, the training code 1014 may generate output including the status of the training job and/or model and output artifacts. Following the specification, the training code 1014 can be crafted to write this information to specific file locations (e.g., located in the container's/output directory). For example, if training fails, after all algorithm output (for example, logging) completes, the training code 1014 can write the failure description to /opt/ml/output/failure. In some embodiments, in a DescribeTrainingJob response (sent responsive to a DescribeTrainingJob request seeking information about a training job), the machine learning service can return data from this file (e.g., the first 1,024 characters from this file) as a FailureReason.

As another example, in some embodiments the training code 1014 writes all final model artifacts to a directory (e.g., /opt/ml/model). The helper code 1020 can copy this data (e.g., as a single object in compressed tar format) to a storage location—e.g., the location specified in a CreateTrainingJob request.

In some embodiments, the helper code 1020 may obtain any obtain standard stream data (e.g., standard output (stdout) and standard error (stderr) data) written to by the training code 1014 and, e.g., send it to a monitoring service 1102 that may provide this data to the associated user.

Turning back to FIG. 10, the container 1012 performs the training of the model, and the model (e.g., as a complete model or a set of model artifacts 1040) can be stored at circle '4' at a location (e.g., in a storage area/bucket of storage virtualization service 1002) by the model training system 120, which in some embodiments is handled by the helper containers 1018.

The user may optionally call, e.g., via a "deploy container" API call shown at circle '5A' (e.g., a "CreateModel" call) to provider network endpoints 1019, the machine learning service 1006 to cause the model to be deployed across one or more machines (e.g., a cluster of machines) to cause the model to be launched and service inference requests.

In some embodiments, a CreateModel call can specify a name of the model and describe one or more containers. For each container, the user may specify/identify the container image 1021/1011 containing inference code 1024, model artifacts 1040 (from prior training), and/or a custom environment map that the inference code uses when the model is deployed into production. In response, the model hosting system 140 then deploys the container(s) for the model in the hosting environment.

A CreateModel call may include one or more parameters. In some embodiments, a CreateModel call includes an ExecutionRoleArn parameter indicating access credentials (e.g., a role, password, etc.) that the model hosting system 140 can use to access data such as model artifacts 1040, container images 1021, etc., that may be protected and require use of the credentials for access. In some embodiments, a CreateModel call includes an ModelName parameter that specifies a name for the model. In some embodiments, a CreateModel call includes a PrimaryContainer parameter that specifies a location of the primary container image 1021 containing inference code 1024, associated artifacts, and custom environment map that the inference code uses when the model is deployed into production. In response to a CreateModel request, the machine learning service 1006 may send back an acknowledgement (e.g., a response, which may include a resource name of the created model) to the client 1008.

Thus, in some embodiments, the model is launched at circle '5B' by deploying a particular container 1022 with inference code 1024 (from a container image 1021 or container image 1011) to one or more virtual machines, which may have been generated by the user or be generated/ provided by the provider network (e.g., which implements a somewhat standard machine learning technique). The container's inference code 1024 may be configured using the model artifacts 1040 at circle '5C' to cause the desired trained model to be implemented.

One or more inference endpoints 1010 can also be configured for the model (e.g., inference code 1024) as well. For example, the user may also configure and deploy an endpoint to be able to interact with the container 1022. For example, a user may create an endpoint configuration with an API call (e.g., a "CreateEndpointConfig" call) and then create the actual endpoint with another API call (e.g., a "CreateEndpoint" call). Such calls may be separate calls or consolidated into one call, and either option is referenced in FIG. 10 as circle '6'.

Thus, a client application 1008, via API requests (e.g., HTTP requests carrying an "InvokeEndpoint" call) issued to inference endpoints 1010 (e.g., at circle '7B'), can issue requests to use the model to perform an inference (e.g., in substantially "real time" as an "online" system). Additionally or alternatively, one or more inferences may be performed using inference input data 1050 (e.g., one inference, multiple inferences performed as a "batch", etc.) shown at circle '7A' stored in storage virtualization service 1002, and thus the request may include an identifier of inference input data 1050. However, in some embodiments, the request itself may include the inference input data or otherwise identify the inference input data.

For example, the requests are provided to a container 1022 including inference code 1024 (which may include or cooperate with a model that is generated using model artifacts 1040), which uses an input provided by the client application (e.g., data in the request, other data at a location—such as within storage virtualization service 1002—identified by the request) to execute the model (or inference code 1024), generate inferences, and send inference results back at circle '8' (e.g., via inference endpoints 1010) to the client application 1008 (or send inference results to a storage location, such as within model prediction data store 180).

In some embodiments, similar to that of the model training system 120, the container 1022 adheres to a specification of the model hosting system 140 allowing the model hosting system 140 to abstract away the complexities involved with performing inference. Accordingly, in some embodiments, this process is "serverless" in that the user/clients do not need to directly manage compute instances (e.g., virtual machines (VMs))—instead, clients 1008 can perform complex machine learning training and/or utilization via API requests, while the machine learning service 1006 manages the complexities of the infrastructure.

Figure 12:
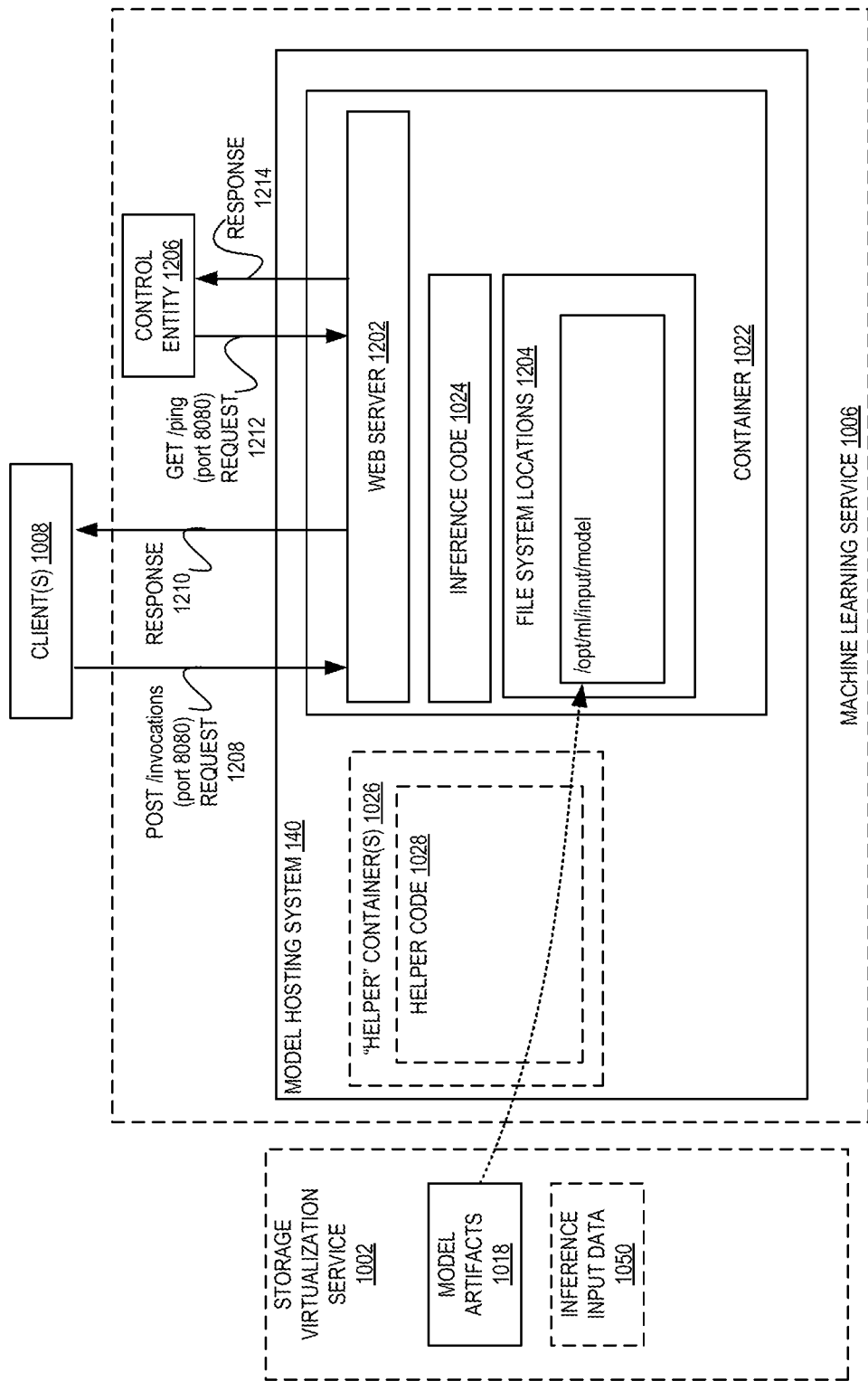
FIG. 12 is a block diagram illustrating container support operations for model inference according to some embodiments.

For example, FIG. 12 is a block diagram illustrating container support operations for model inference according to some embodiments. As shown, the inference code 1024 may adhere to a specification and thus attempt to read model artifacts from a particular file system location 1204—here, /opt/ml/input/model.

For example, in some embodiments, a CreateModel request may include, as part of a container definition, a ModelDataUrl parameter that identifies a storage location where model artifacts 1040 are stored. The model hosting system 140 can use this information to obtain the relevant model artifacts, and copy these artifacts to the /opt/ml/model directory for use by the inference code 1024. In some embodiments, the ModelDataUrl points to a tar.gz file, and thus the model hosting system 140 may decompresses this tar file into the /opt/ml/model directory before the container 1022 starts.

As another part of adhering to the specification, in some embodiments the container 1022 implements a web server 1202 and respond to particular requests. For example, in some embodiments containers implement a web server that respond to certain HTTP requests (e.g., for /invocations and /ping on port 8080).

For example, to obtain inferences, a client 1008 application may send a POST request 1208 (e.g., an "InvokeEndpoint" call) to a configured endpoint, which is passed to the container 1022, and thereafter the container returns the inference result from the container to the client as a response 1210. Thus, in some embodiments, to adhere to the specification the web server 1202 listens on port 8080 and accepts POST requests to the /invocations endpoint.

As another example, in some embodiments, a control entity 1206 of the machine learning service 1006 may send health check requests 1212 (e.g., HTTP GET requests to a /ping endpoint) to the container 1022, and thus to adhere to the specification the web server 1202 accepts such requests 1212 and responds with a response 1214 (e.g., including an HTTP 200 status code and an empty body) when the container 1022 is able to accept inference requests.

Accordingly, embodiments can use various continuation technologies, e.g., Docker containers. Thus, containers may be generated by users according to a specification defined by the machine learning service 1006, which specifies that the container is to behave in certain ways. For example, turning back to FIG. 10, the specification may indicate that a container may need to accept input in certain way, signal success in certain way, write output (e.g., a model or model data as model artifacts 1040) to certain location (e.g., file system directory), get parameters through a particular file, etc. Thus, in some embodiments a user can write a program for training code 1014 (e.g., in one or multiple languages desired by the user—python, C++, Scala, etc.), and write—according to the specification—data in a particular location (e.g., "/opt/ml/config/hyperparameters.json") to find a file (e.g., JSON formatted file) with hyperparameters for the training, such as a number of passes over data during training, how deep to make trees, how many classes are to be used, etc., as specified by user. The training code 1014 may also, for example, need to write generated model data to a particular file system location (e.g., /opt/ml/model/) that can be moved, e.g., by helper containers 1018 to model artifacts 1040 in the storage virtualization service 1002.

For the hosting container 1022, the specification may indicate the container 1022 is to act as a web server, respond to certain types of requests on a particular port or ports (e.g., 8080), respond to certain types of requests in a certain way, etc. When executed, the container 1022 can be provided the model, e.g., by mounting or importing model artifacts 1040 for the container 1022 to use. Thus, when the container is executed, it can read the model from a specification-defined location (in whatever format the user wants), and can start serving requests. The infrastructure of the machine learning service 1006 can—using the helper container(s) 1026 and other entities—deploy these containers 1022, manage HTTP connections (e.g., perform SSL/TLS termination, etc.) to the "outside" world (e.g., outside of the machine learning service 1006), manage the life cycle of containers (e.g., how many are needed to be deployed for a particular model to meet the needs of the user, etc.).

Alternatively, in some embodiments, a user may only utilize the model training system 120 and not the model hosting system 140; and in other embodiments, a user may only utilize the model hosting system 140 and not the model training system 120.

For example, a user may only want to perform training. As one example, a user may wish to train a model for Internet of Things (IoT) devices (e.g., a toy robot) and may wish to generate a model using the machine learning service 1006—which is simple to use and offers substantial computing resources that the user may not have—to generate a model, and the user may download this model (e.g., model artifacts 1040) to be deployed in an IoT device.

As another example, some users may have models that they wish to flexibly deploy using resources of the provider network 199, for example, to leverage the flexible amounts of compute power offered there, the infrastructure and security, etc. Thus, a user may simply create a container 1022 that performs inference using their own model(s) and deploy this container to the model hosting system 140.

Accordingly, users can provide a container 1012 and/or training data 1016 (e.g., of training data store 160) to the provider network 199 and issue a "CreateTrainingJob" API call to begin training. The API call may include an image identifier (e.g., of container 1012) as part of this call, identify the training data 1016, identify hyperparameters to be used, indicate where the output (e.g., model artifacts) are to go, what type and/or numbers of machines/hosts the container 1012 is to be run on, etc.

To start the job, the machine learning service 1006 can provision the necessary hardware for the training, pull the container 1012 onto the hardware, orchestrate the startup of the container(s) and communication between them (e.g., when a training job is performed using multiple container instances), etc. The training may occur from anywhere between a few seconds to many days, weeks, or months. The machine learning service 1006 can thus manage the training run, obtain status information, report the training job run status to the client, perform logging for the container, etc.

At some point, the training job may complete on its own accord (e.g., due to meeting a certain level of accuracy), run out of time, be canceled by a user, etc. The model can be sent to a file location and stored as model artifacts 1040. The model can now be obtained by the user and used outside of the machine learning service 1006, or can be deployed within model hosting system 140.

For example, to deploy the model, the user can issue a set of API calls to introduce the model into the hosting environment, e.g., by deploying the model onto an endpoint using a container 1022. Now, other applications (inside or outside of the provider network 199) can call the model (e.g., using HTTP calls), and the inference results can be returned. The model can thus be hosted transparently by the model hosting system 140 by controlling how the model is deployed, e.g., by provisioning machines (e.g., based on customer requirements for the model, such as an acceptable amount of latency, resource usage, etc.), by auto-scaling up or down the amount of resources for the model (e.g., based on a load).

In some embodiments, the model hosting system 140 can implement A/B testing on behalf of a client, e.g., to deploy an amount of instances (and/or service an amount of request traffic) with a first model A, to deploy another amount of instances (and/or service another amount of request traffic) with a second model B, etc.

In some embodiments, users need not completely construct a container 1012/1022 and may pre-configured containers offered by the provider network 199, which may simply be configured/tweaked in minor ways to configure the particular training/hosting job for the user.

As described herein, some embodiments use helper container(s) 1026/1018 to support the training and/or hosting of models. The helper container(s) 1026/1018 can act as architectural supports for the "main" container, so that container can be simpler (and smaller and easier to create) by removing the burden from it to perform architectural operations.

For example, the helper container(s) 1026/1018 could perform one or more support operations, such as feeding data from a storage virtualization service 1002 into the container (e.g., training data 1016), receiving and processing HTTP calls and translating them into simple commands for the container, performing monitoring of the container/training/hosting, monitoring for the completion of training, performing data upload tasks for the containers (e.g., sending the model artifacts 1040 to the storage virtualization service 1002), manage logging, etc.

In some embodiments, the machine learning service 1006 is flexible to particular protocols, data types of inputs, etc., that the user wishes to use. Thus, the involved data—such as training data, or data used as an input to the model for inference—can take nearly any sort of shape/type (e.g., comma separated values, raw sensor data, record input/output (I/O) format data, etc.). Thus, embodiments provide users an interface, but do not dictate the particular type or format content that goes over it, as opposed to simpler systems that might require a certain format of data (e.g., a "Tensor format"). Thus, embodiments can provide tremendous flexibility to users to perform complex and powerful tasks simply, through use of a minimal lightweight schema/specification of containers. As an additional benefit, users can easily update a model by deploying a new version (or versions) of the model within the model hosting system 140 without needing to update an application (e.g., client 1008) that relies on the model—thus, this decoupling can greatly reduce the complexity of maintaining the client 1008 and the model by separating the two.

Figure 13:
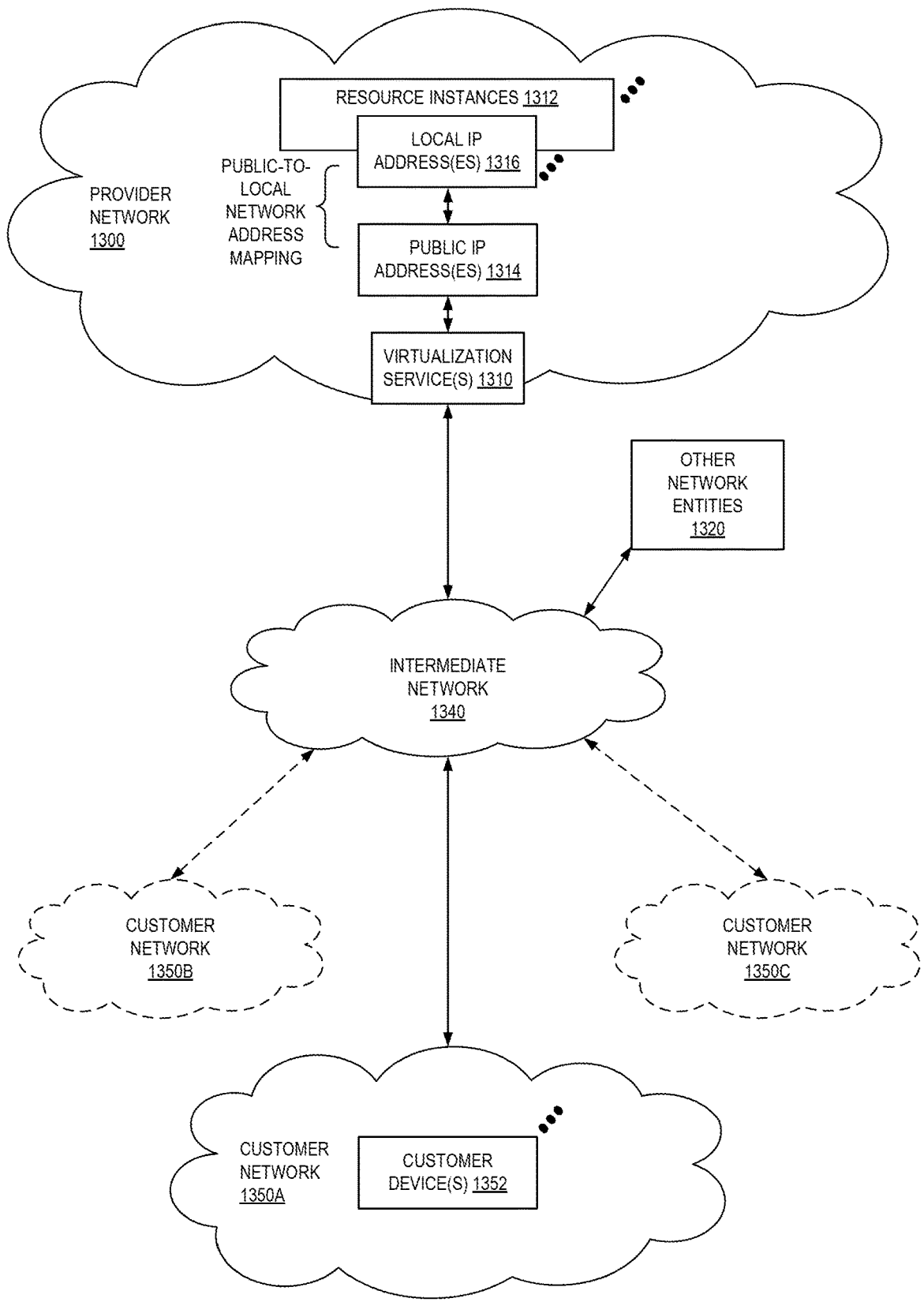
FIG. 13 illustrates an example provider network environment according to some embodiments.

FIG. 13 illustrates an example provider network (or "service provider system") environment according to some embodiments. A provider network 1300 may provide resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 may be associated with the resource instances 1312; the local IP addresses are the internal network addresses of the resource instances 1312 on the provider network 1300. In some embodiments, the provider network 1300 may also provide public IP addresses 1314 and/or public IP address ranges (e.g., Internet Protocol version 4 (IPv4) or Internet Protocol version 6 (IPv6) addresses) that customers may obtain from the provider 1300.

Conventionally, the provider network 1300, via the virtualization services 1310, may allow a customer of the service provider (e.g., a customer that operates one or more client networks 1350A-1350C including one or more customer device(s) 1352) to dynamically associate at least some public IP addresses 1314 assigned or allocated to the customer with particular resource instances 1312 assigned to the customer. The provider network 1300 may also allow the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of customer network(s) 1350A-1350C may, for example, implement customer-specific applications and present the customer's applications on an intermediate network 1340, such as the Internet. Other network entities 1320 on the intermediate network 1340 may then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 may be routed via the network substrate back onto the intermediate network 1340 to the source entity 1320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1300; a customer may then assign their allocated public IP addresses to particular resource instances allocated to the customer. These public IP addresses may be referred to as customer public IP addresses, or simply customer IP addresses. Instead of being assigned by the provider network 1300 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 14:
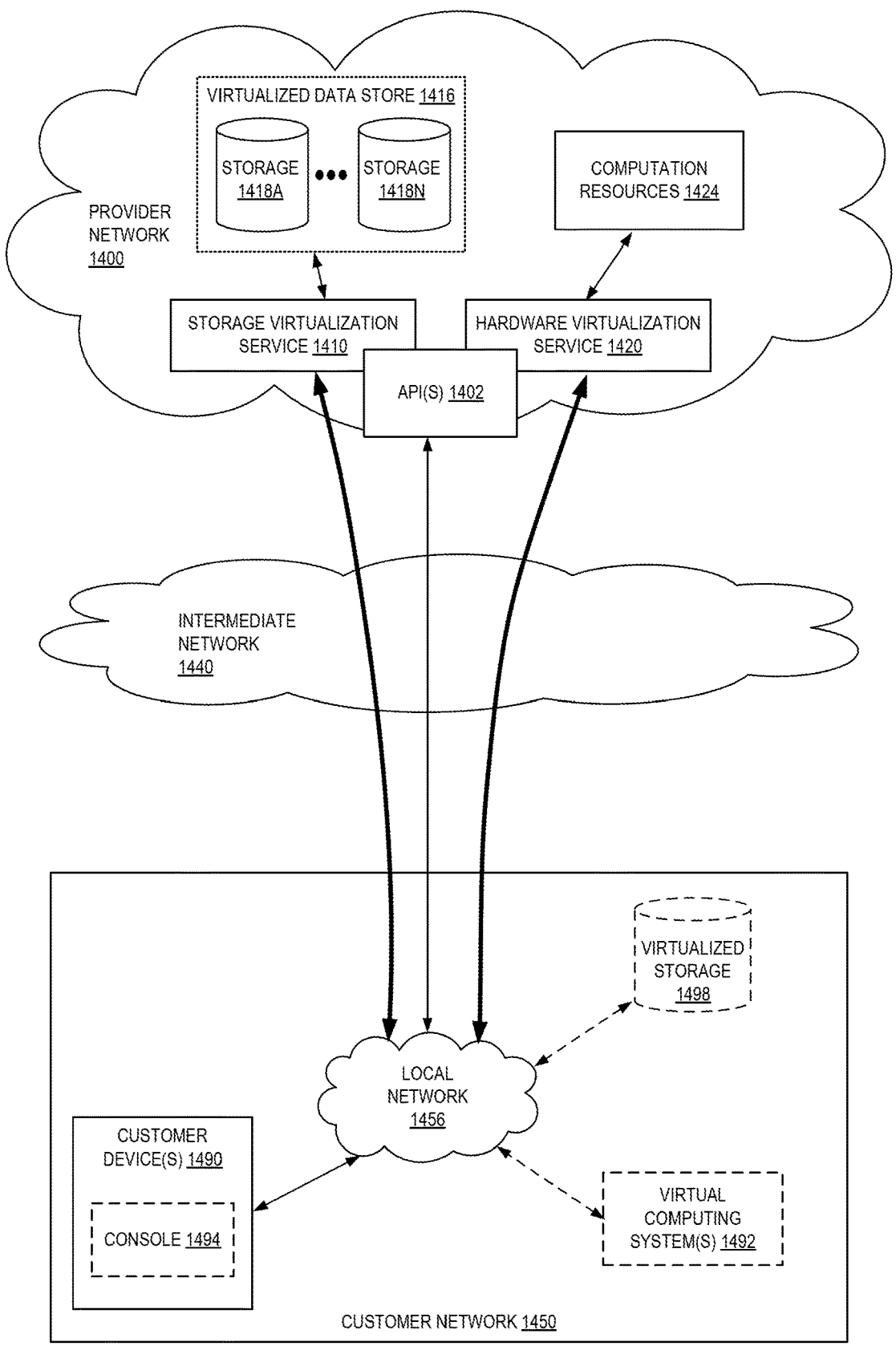
FIG. 14 is a block diagram of an example provider network that provides a storage virtualization service and a hardware virtualization service to customers according to some embodiments.

FIG. 14 is a block diagram of an example provider network that provides a storage virtualization service and a hardware virtualization service to customers, according to some embodiments. Hardware virtualization service 1420 provides multiple computation resources 1424 (e.g., VMs) to customers. The computation resources 1424 may, for example, be rented or leased to customers of the provider network 1400 (e.g., to a customer that implements customer network 1450). Each computation resource 1424 may be provided with one or more local IP addresses. Provider network 1400 may be configured to route packets from the local IP addresses of the computation resources 1424 to public Internet destinations, and from public Internet sources to the local IP addresses of computation resources 1424.

Provider network 1400 may provide a customer network 1450, for example coupled to intermediate network 1440 via local network 1456, the ability to implement virtual computing systems 1492 via hardware virtualization service 1420 coupled to intermediate network 1440 and to provider network 1400. In some embodiments, hardware virtualization service 1420 may provide one or more APIs 1402, for example a web services interface, via which a customer network 1450 may access functionality provided by the hardware virtualization service 1420, for example via a console 1494 (e.g., a web-based application, standalone application, mobile application, etc.). In some embodiments, at the provider network 1400, each virtual computing system 1492 at customer network 1450 may correspond to a computation resource 1424 that is leased, rented, or otherwise provided to customer network 1450.

From an instance of a virtual computing system 1492 and/or another customer device 1490 (e.g., via console 1494), the customer may access the functionality of storage virtualization service 1410, for example via one or more APIs 1402, to access data from and store data to storage resources 1418A-1418N of a virtual data store 1416 provided by the provider network 1400. In some embodiments, a virtualized data store gateway (not shown) may be provided at the customer network 1450 that may locally cache at least some data, for example frequently accessed or critical data, and that may communicate with virtualized data store service 1410 via one or more communications channels to upload new or modified data from a local cache so that the primary store of data (virtualized data store 1416) is maintained. In some embodiments, a user, via a virtual computing system 1492 and/or on another customer device 1490, may mount and access virtual data store 1416 volumes, which appear to the user as local virtualized storage 1498.

While not shown in FIG. 14, the virtualization service(s) may also be accessed from resource instances within the provider network 1400 via API(s) 1402. For example, a customer, appliance service provider, or other entity may access a virtualization service from within a respective virtual network on the provider network 1400 via an API 1402 to request allocation of one or more resource instances within the virtual network or within another virtual network.

Figure 15:
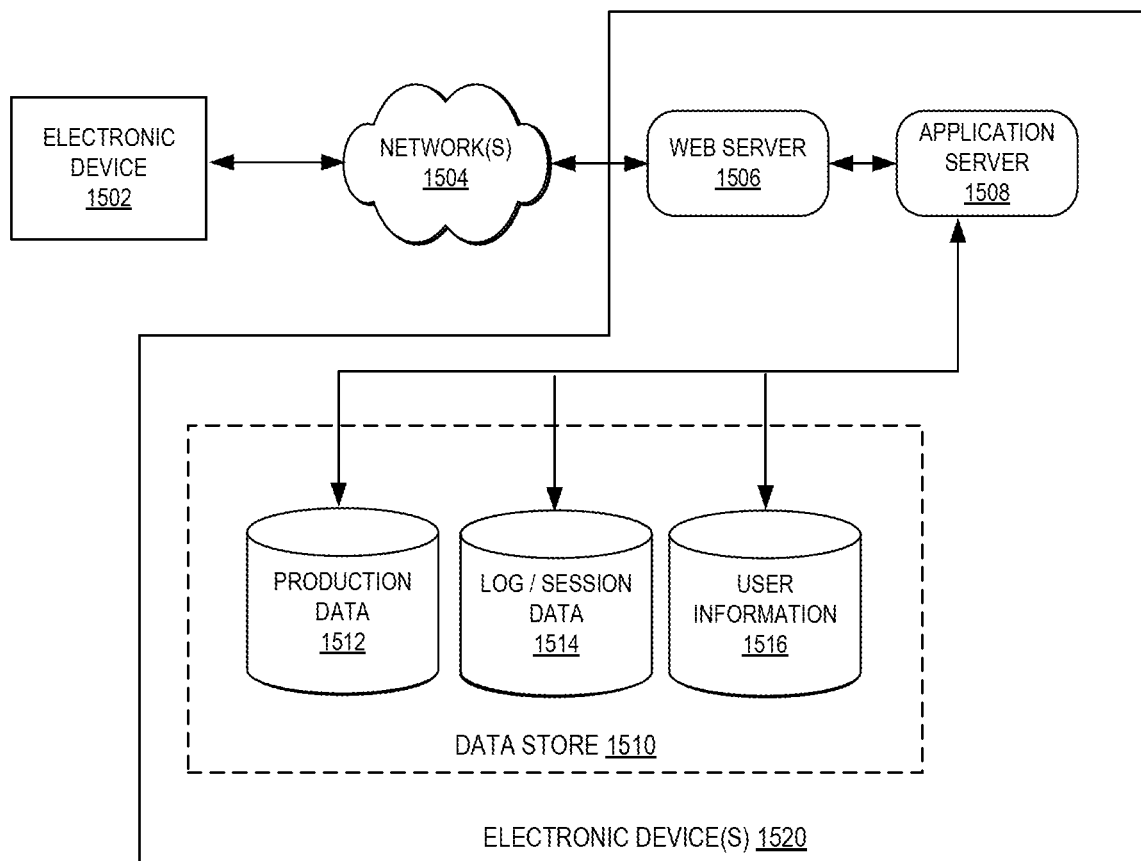
FIG. 15 illustrates an example of an environment for implementing aspects in accordance with various embodiments.

As discussed, different approaches can be implemented in various environments in accordance with the described embodiments. For example, FIG. 15 illustrates an example of an environment 1500 for implementing aspects in accordance with various embodiments. For example, in some embodiments the messages (e.g., requests and/or responses) described herein are HTTP messages that are sent or received by a web server (e.g., web server 1506), and the users, via electronic devices, may interact with the provider network via a web portal provided via the web server 1506 and application server 1508. As will be appreciated, although a web-based environment is used for purposes of explanation, different environments may be used, as appropriate, to implement various embodiments. The system includes an electronic client device 1502, which may also be referred to as a client device and can be any appropriate device operable to send and receive requests, messages or information over an appropriate network 1504 and convey information back to a user of the device 1502. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1504 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1504 includes the Internet, as the environment includes a web server 1506 for receiving requests and serving content in response thereto, although for other networks an alternative device serving a similar purpose could be used, as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device 1502 and handling a majority of the data access and business logic for an application. The application server 1508 provides access control services in cooperation with the data store 1510 and is able to generate content such as text, graphics, audio, video, etc., to be transferred to the client device 1502, which may be served to the user by the web server in the form of HyperText Markup Language (HTML), XML, JSON, or another appropriate unstructured or structured language in this example. The handling of all requests and responses, as well as the delivery of content between the client device 1502 and the application server 1508, can be handled by the web server 1506. It should be understood that the web server 1506 and application server 1508 are not required and are merely example components, as structured code discussed herein can be executed on any appropriate device or host machine as discussed elsewhere herein.

The data store 1510 can include several separate data tables, databases, or other data storage mechanisms and media for storing data relating to a particular aspect. For example, the data store illustrated includes mechanisms for storing production data 1512 and user information 1516, which can be used to serve content for the production side. The data store 1510 also is shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update, or otherwise process data in response thereto. In one example, a user might submit a search request for a certain type of item. In this case, the data store 1510 might access the user information 1516 to verify the identity of the user and can access a production data 1512 to obtain information about items of that type. The information can then be returned to the user, such as in a listing of results on a web page that the user is able to view via a browser on the user device 1502. Information for a particular item of interest can be viewed in a dedicated page or window of the browser.

The web server 1506, application server 1508, and/or data store 1510 may be implemented by one or more electronic devices 1520, which can also be referred to as electronic server devices or server end stations, and may or may not be located in different geographic locations. Each of the one or more electronic devices 1520 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the environment 1500 in FIG. 15 should be taken as being illustrative in nature and not limiting to the scope of the disclosure.

Methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Thus, disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
receiving, at a service provider network, a user-created container image comprising user-provided machine learning (ML) training code;
adding the container image to a container registry;
receiving a request to start a job to train an ML model within the service provider network on behalf of the user, the request identifying a location of the container image available in the container registry, a number of containers to be used for the job, a storage location where one or more model artifacts generated as a result of training the ML model are to be stored, and a stopping value amount of time indicating a maximum duration for the training;
running the ML model training job based at least in part on use of the identified location of the container image, the identified storage location, the identified number of containers, and the identified stopping value, comprising:
obtaining the container image from the container registry based on use of the identified location;
executing one or more containers via use of the container image and based on use of the identified number of containers;
providing training data to the one or more containers, whereby the user-provided ML training code executes and utilizes the training data to train the ML model for up to the duration indicated by the stopping value; and
storing the one or more model artifacts generated as a result of training the ML model at the storage location.

2. The computer-implemented method of claim 1, wherein:
the training data is provided to the one or more containers as one or more files in a first local directory in each container or as one or more input streams accessible within the container; and
storing the one or more model artifacts comprises obtaining the one or more model artifacts from a second local directory in the container and sending the one or more model artifacts or an archived version of the one or more model artifacts to the storage location.

3. The computer-implemented method of claim 1, further comprising:
receiving a second request to create an instance of the ML model within the service provider network, the second request identifying the storage location of the one or more model artifacts;
executing a second container, the second container including inference code based at least in part on use of the one or more model artifacts;
receiving a request to perform an inference;
generating an inference value by executing the inference code; and
sending a response to the request that comprises the inference value.

4. The computer-implemented method of claim 1, wherein the ML training code is written in the Python language.

5. The computer-implemented method of claim 4, wherein the ML training code utilizes a TensorFlow deep learning framework or an XGBoost algorithm.

6. The computer-implemented method of claim 1, wherein the one or more containers are Docker containers.

7. The computer-implemented method of claim 1, wherein each of the one or more containers is executed by a virtual machine instance.

8. The computer-implemented method of claim 1, wherein the running of the ML model training job occurs based on use of a user-provided value indicating a role or set of permissions to be used for accessing resources within the service provider network.

9. A system comprising:
a first one or more electronic devices to implement a storage service of a service provider network;
a second one or more electronic devices to implement a container registry in the service provider network, the container registry including instructions that upon execution cause the service provider network to:
receive a user-created container image comprising user-provided machine learning (ML) training code;
add the container image to the container registry; and
a third one or more electronic devices to implement a machine learning service in the provider network, the machine learning service including instructions that upon execution cause the machine learning service to:
receive a request to start a job to train an ML model on behalf of the user, the request at least identifying a location of the container image within the container registry, a number of containers to be used for the job, a storage location provided by the storage service where one or more model artifacts generated as a result of training the ML model are to be stored, and a stopping value amount of time indicating a maximum duration for the training; and
run the ML model training job based at least in part on use of the identified location of the container image, the identified storage location, the identified number of containers, and the identified stopping value, wherein the machine learning service is to:
obtain the container image from the container registry based on use of the identified location;
execute one or more containers via use of the container image and based on use of the identified number of containers;
provide training data to the one or more containers, whereby the user-provided ML training code executes and utilizes the training data to train the ML model for up to the duration indicated by the stopping value; and
store the one or more model artifacts generated as a result of the training of the ML model at the storage location provided by the storage service.

10. The system of claim 9, wherein the ML training code is written in the Python language.

11. The system of claim 4, wherein the ML training code utilizes a TensorFlow deep learning framework or an XGBoost algorithm.

12. The system of claim 9, wherein to store the one or more model artifacts generated as a result of training the ML model, the machine learning service is to:
access the one or more model artifacts from a first local directory in the container; and
store the one or more model artifacts or an archived version of the one or more model artifacts at the storage location.

13. The system of claim 12, wherein to provide training data to the one or more containers, the machine learning service is to:
provide the training data to each container as one or more files in a second local directory in the corresponding container or as one or more input streams accessible within the corresponding container.

14. The system of claim 9, wherein the running of the ML model training job occurs based on use of a user-provided value indicating a role or set of permissions to be used for accessing resources within the service provider network.

15. One or more non-transitory computer-readable media storing instructions which, when executed by one or more processors of one or more computing devices operative as part of a service provider network, cause the one or more computing devices to perform operations comprising:
  receiving a user-created container image comprising user-provided machine learning (ML) training code;
  adding the container image to a container registry;
  receiving a request to start a job to train an ML model within the service provider network on behalf of the user, the request identifying a location of the container image available in the container registry, a number of containers to be used for the job, a storage location where one or more model artifacts generated as a result of training the ML model are to be stored, and a stopping value amount of time indicating a maximum duration for the training;
  running the ML model training job based at least in part on use of the identified location of the container image, the identified storage location, the identified number of containers, and the identified stopping value, comprising:
    obtaining the container image from the container registry based on use of the identified location;
    executing one or more containers via use of the container image and based on use of the identified number of containers;
    providing training data to the one or more containers, whereby the user-provided ML training code executes and utilizes the training data to train the ML model for up to the duration indicated by the stopping value; and
    storing the one or more model artifacts generated as a result of training the ML model at the storage location.

16. The one or more non-transitory computer-readable media of claim 15, wherein:
  the training data is provided to the one or more containers as one or more files in a first local directory in each container or as one or more input streams accessible within the container; and
  storing the one or more model artifacts comprises obtaining the one or more model artifacts from a second local directory in the container and sending the one or more model artifacts or an archived version of the one or more model artifacts to the storage location.

17. The one or more non-transitory computer-readable media of claim 15, wherein the operations further comprise:
  receiving a second request to create an instance of the ML model within the service provider network, the second request identifying the storage location of the one or more model artifacts;
  executing a second container, the second container including inference code based at least in part on use of the one or more model artifacts;
  receiving a request to perform an inference;
  generating an inference value by executing the inference code; and
  sending a response to the request that comprises the inference value.

18. The one or more non-transitory computer-readable media of claim 15, wherein the ML training code is written in the Python language.

19. The one or more non-transitory computer-readable media of claim 18, wherein the ML training code utilizes a TensorFlow deep learning framework or an XGBoost algorithm.

20. The one or more non-transitory computer-readable media of claim 15, wherein the one or more containers are Docker containers.

* * * * *